US012026926B2

(12) United States Patent
Das et al.

(10) Patent No.: US 12,026,926 B2
(45) Date of Patent: Jul. 2, 2024

(54) AUTOMATICALLY UPDATING A CARD-SCAN MACHINE LEARNING MODEL BASED ON PREDICTING CARD CHARACTERS

(71) Applicant: Lyft, Inc., San Francisco, CA (US)

(72) Inventors: Ritwik Subir Das, Moutain View, CA (US); Joan Devassy, San Mateo, CA (US); Nadha Nafeeza Gafoor, Sunnyvale, CA (US); Aahel Iyer, San Francisco, CA (US); Swarn Avinash Kumar, Mountain View, CA (US); Angela Lam, Sunnyvale, CA (US); Kia Nishimine, Fairfax, CA (US); Wiebke Poerschke, Portland, OR (US); John Michael Sparks, San Francisco, CA (US); Hristo Stefanov Stefanov, San Francisco, CA (US); Wei You, Redwood Shores, CA (US)

(73) Assignee: Lyft, Inc., San Francisco, CA (US)

( * ) Notice: Subject to any disclaimer, the term of this patent is extended or adjusted under 35 U.S.C. 154(b) by 756 days.

(21) Appl. No.: 17/063,033

(22) Filed: Oct. 5, 2020

(65) Prior Publication Data
US 2022/0108121 A1   Apr. 7, 2022

(51) Int. Cl.
*G06N 20/00* (2019.01)
*G06F 18/214* (2023.01)
(Continued)

(52) U.S. Cl.
CPC ........ *G06V 10/242* (2022.01); *G06F 18/2148* (2023.01); *G06N 20/00* (2019.01);
(Continued)

(58) Field of Classification Search
CPC .................................................. G06V 10/242
See application file for complete search history.

(56) References Cited

U.S. PATENT DOCUMENTS

| 2014/0112526 A1* | 4/2014 | Kim | G06V 30/262 |
| | | | 382/103 |
| 2015/0347859 A1* | 12/2015 | Dixon | G06V 30/2253 |
| | | | 382/138 |

(Continued)

OTHER PUBLICATIONS

A. Adepoju. "Comparative Evaluation of Credit Card Fraud Detection Using Machine Learning Techiques" publisher , IEEE . 2019. (Year: 2019).*

(Continued)

*Primary Examiner* — Oneal R Mistry
(74) *Attorney, Agent, or Firm* — Keller Preece PLLC

(57) ABSTRACT

This disclosure describes a card-scan system that can update a card-scan machine learning model to improve card-character predictions for payment cards, driver licenses, or other character-bearing cards by using an active-learning technique that learns from card-scan representations indicating corrections by users to predicted card characters. In particular, the disclosed systems can use a client device to capture and analyze a set of card images of a character-bearing card to predict card characters using a card-scan machine learning model. The disclosed systems can further receive card-scan gradients representing one or more corrections to incorrectly predicted card characters. Based on the card-scan gradients, the disclosed systems can generate active-learning metrics and retrain or update the card-scan machine learning model based on such active-learning metrics. By utilizing and updating the card-scan machine learning model, the disclosed systems can improve the accuracy with which card-character-detection systems predict card characters while preserving data security and verifying the presence of a physical character-bearing card.

20 Claims, 15 Drawing Sheets

(51) Int. Cl.
*G06Q 20/34* (2012.01)
*G06V 10/24* (2022.01)
*G06V 10/25* (2022.01)

(52) U.S. Cl.
CPC ....... *G06Q 20/353* (2013.01); *G06Q 20/3552* (2013.01); *G06V 10/25* (2022.01)

(56) References Cited

U.S. PATENT DOCUMENTS

| | | | | |
|---|---|---|---|---|
| 2015/0347860 | A1* | 12/2015 | Meier | G06V 10/243 |
| | | | | 382/140 |
| 2018/0114142 | A1* | 4/2018 | Mueller | G06F 16/906 |
| 2020/0076835 | A1* | 3/2020 | Ladnai | G06N 20/20 |
| 2020/0250417 | A1* | 8/2020 | Torres | G06V 30/19173 |
| 2022/0414766 | A1* | 12/2022 | Miroshnikov | G06Q 40/03 |
| 2023/0012272 | A1* | 1/2023 | Wexler | G06F 3/017 |

OTHER PUBLICATIONS

Madakannu "DIGI-Net: a deep convolutional neural network for multi-format digit recognition" Neural Computing and Applications (2020) 32:11373-11383 https://doi.org/10.1007/s00521-019-04632-9 (Year: 2019).*

Alexey Dosovitskiy, Philipp Fischer, Eddy Ilg, Philip Hausser, Caner Hazirbas, Vladimir Golkov, Patrick Van Der Smagt, Daniel Cremers, and Thomas Brox, Flownet: Learning Optical Flow with Convolutional Neural Networks, Proceedings of the IEEE Int'l Conf. on Computer Vision, 2758-66 (2015).

* cited by examiner

AUTOMATICALLY UPDATING A CARD-SCAN MACHINE LEARNING MODEL BASED ON PREDICTING CARD CHARACTERS

BACKGROUND

In recent years, both popularity and usage of card-character-detection systems have increased. Indeed, the proliferation of web and mobile applications has facilitated capturing digital images of, and extracting information from, character-bearing cards, such as payment cards, driver licenses, or government-identification cards. For instance, conventional card-character-detection systems can capture a digital image of a character-bearing card and can identify information contained on the character-bearing card. Despite recent advances, conventional card-character-detection systems continue to suffer from a number of disadvantages. For example, many conventional card-character-detection systems inaccurately identify information from a character-bearing card by either missing digits, letters, or other characters entirely or predicting such characters incorrectly. As a result, some conventional card-character-detection systems provide user interfaces that require excessive user interaction to correct inaccurate information, such as payment information or driver-license information. Additionally, many conventional card-character-detection systems are insecure and rely on inferior authentication techniques to authenticate payment information from a character-bearing card.

SUMMARY

This disclosure describes one or more embodiments of methods, non-transitory computer-readable media, and systems that can solve the foregoing problems in addition to providing other benefits. In particular, the disclosed systems can update a card-scan machine learning model to better predict characters from payment cards, driver licenses, or other character-bearing cards by using an active-learning technique that learns from card-scan representations indicating corrections by users to predicted card characters. For example, the card-scan system can use a client device to predict card digits, letters, or other characters from character-bearing cards utilizing a card-scan machine learning model. The disclosed systems can further generate active-learning metrics corresponding to such predictions and update the card-scan machine learning model based on the active-learning metrics to improve upon previous predictions. By utilizing and updating the card-scan machine learning model, the disclosed systems can improve the accuracy with which card-character-detection systems predict card characters. The disclosed systems can further improve data security over conventional card-character-detection systems by using card-scan gradients and verifying the authenticity and/or the presence of a physical character-bearing card.

BRIEF DESCRIPTION OF THE DRAWINGS

The detailed description refers to the drawings briefly described below.

DETAILED DESCRIPTION

Figure 1:
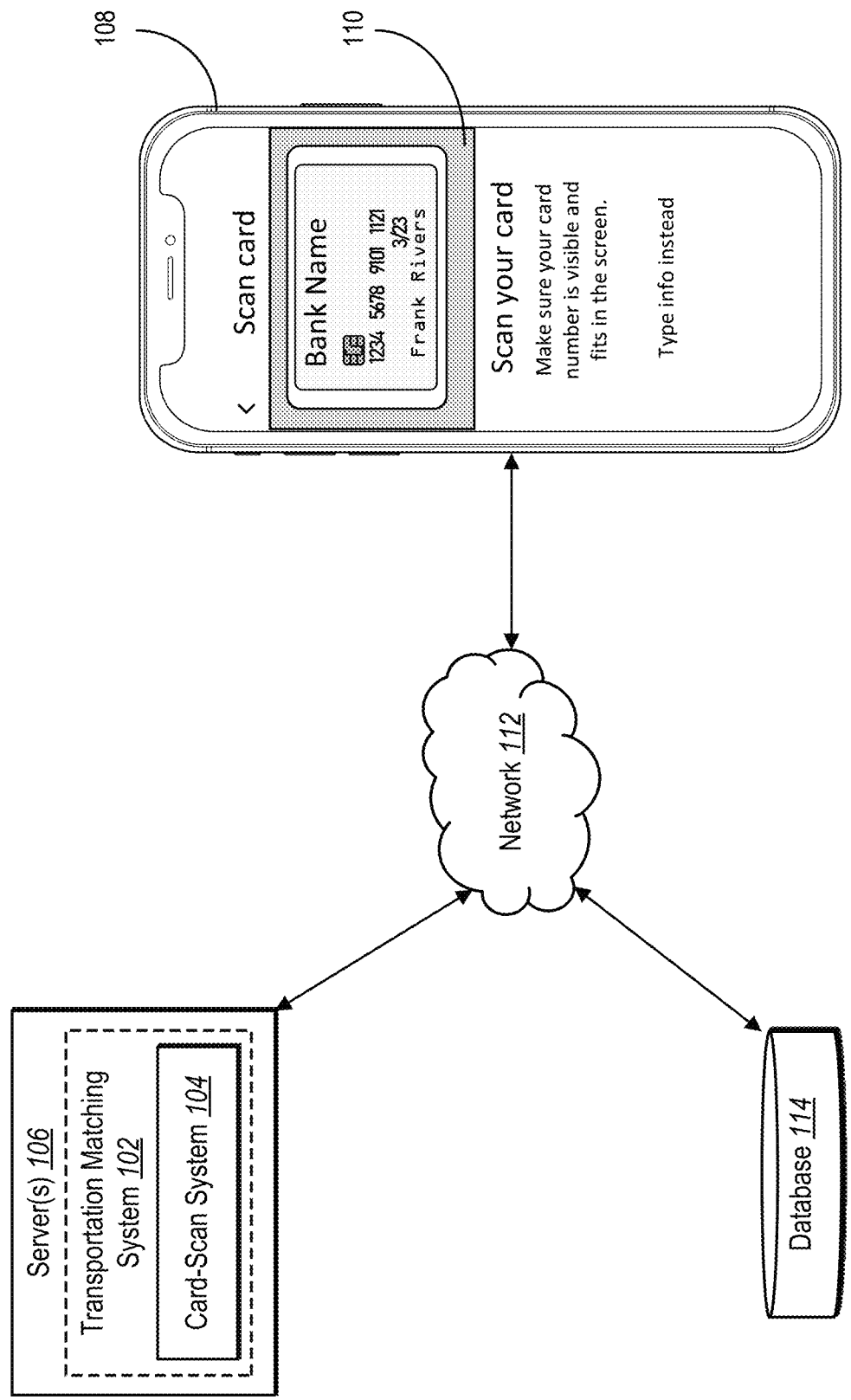
FIG. 1 illustrates a block diagram of an environment for implementing a card-scan system in accordance with one or more embodiments.

This disclosure describes a card-scan system that can update a card-scan machine learning model to improve card-character predictions by using an active-learning technique that learns from card-scan representations indicating corrections by users to predicted card characters. For instance, the card-scan system can generate predicted card characters from a set of card images (e.g., video or moving image) utilizing a card-scan machine learning model. Based on such card-character predictions, the card-scan system can implement an active learning technique to improve the prediction accuracy of the card-scan machine learning model. For instance, the card-scan system can detect edits or corrections to predicted labels of card characters (resulting from incorrect predictions) and can utilize vectors indicting such card-scan corrections to inform retraining the card-scan machine learning model. Further, the card-scan system can utilize the card-scan machine learning model to verify the presence and authenticity of a physical character-bearing card (e.g., a payment card or a driver license), while also obfuscating card characters, to ensure increased data security for payment information and transaction processing.

For example, the card-scan system captures a set of card images via a client device. From the set of card images, the card-scan system generates predicted card characters by utilizing a card-scan machine learning model. Based on the predicted card characters, the card-scan system further generates a card-scan gradient that includes multidimensional values representing corrections made to the predicted card characters. In some cases, the card-scan gradient represents corrections made by a user to fix errors in the predicted card characters. Based on the card-scan gradient, the card-scan system determines an active-learning metric that indicates a measure of prediction improvement to the card-scan machine learning model by training on variations of the card-scan gradient. By iteratively modifying or retraining the card-scan machine learning model based on such card-scan gradients and active-learning metrics, the card-scan system further generates an updated card-scan machine learning model.

As mentioned, the card-scan system can capture or receive card images. More specifically, the card-scan system can capture or receive sets of card images in the form of digital videos or moving images (e.g., around 150 frames). Thus, rather than utilizing a single still image of a character-bearing card, the card-scan system can receive a moving depiction of the character-bearing card to verify its authenticity as a physical character-bearing card as well to extract or identify card characters. For instance, the card-scan system can receive a set of card images that portray the character-bearing card from the front, the back, and that further portray a manipulation (e.g., a flip or a rotation) of the character-bearing card from front to back (or vice-versa).

From the set of card images, the card-scan system can automatically identify card characters utilizing a card-scan machine learning model. To elaborate, the card-scan system can utilize the card-scan machine learning model to generate bounding boxes indicating locations of, and enclosing, card characters. The card-scan system can further utilize the card-scan machine learning model to generate predictions of card characters for each of the bounding boxes by, for example, generating probabilities of a character within a bounding box corresponding to different numbers or letters.

In some embodiments, the card-scan system implements a particular card-scan machine learning model. For example, the card-scan system can utilize a machine learning model from an open source library, such as TensorFlow, and update the parameters in accordance with an active learning technique. In some cases, the card-scan system accesses and modifies a card-scan machine learning model having a certain architecture suitable for identifying characters on cards. For instance, in certain embodiments, the card-scan system modifies a TensorFlow Model Zoo machine learning model using an active learning technique.

In some embodiments, the card-scan system implements a card-scan machine learning model trained on data other than card images. More specifically, the card-scan system can generate the card-scan machine learning model by modifying a machine learning model utilized in a different context, such as a traffic-sign machine learning model trained to identify traffic-sign characters. To modify the traffic-sign machine learning model, the card-scan system can modify a loss function associated with the traffic-sign machine learning model to reduce a subtraction space and thereby generate a card-scan machine learning model. To elaborate, in some embodiments, the card-scan system can generate features for a traffic-sign image utilizing the traffic-sign model and can generate features for a character-bearing-card image utilizing the same traffic-sign model. The card-scan system can further generate a subtraction space that represents the differences between the features of the traffic-sign image and the features of the character-bearing-card image.

To improve the accuracy of the card-scan machine learning model in predicting card characters, the card-scan system can implement an active learning technique. Using active learning, the card-scan system improves the card-scan machine learning model based on the difference between predicted card characters and actual, correct card characters. Indeed, the card-scan system trains the card-scan machine learning model on both positive examples (e.g., a card-scan gradient for correctly labeled characters) and negative examples (e.g., a card-scan gradient for incorrectly labeled characters). Thus, not only does the card-scan system increase a learning rate of the card-scan machine learning model, but the card-scan system also reduces a forgetting rate for what the card-scan machine learning model already predicts correctly from previous iterations.

As part of the active learning, the card-scan system can receive a card-scan correction in the form of a card-scan gradient that indicates one or more corrections made to predicted card characters. Indeed, from one or more incorrectly predicted card characters for a character-bearing card (e.g., mistaking a 6 for an 8), the card-scan system can receive or generate a card-scan gradient (e.g., a multidimensional matrix or vector) that indicates corrections that a user had to make to fix the incorrect prediction(s). For instance, the card-scan system can compare (or cause a client device to compare) the predicted card character (or a corresponding vector) with an actual card character (or a corresponding vector) to generate a card-scan gradient that reflects the user correction capturing the actual card character.

Based on such a card-scan gradient that reflects user correction, the card-scan system can generate additional modified card-scan gradients for retraining the card-scan machine learning model. Specifically, the card-scan system can modify the card-scan gradient with minor perturbations across dimensions of the card-scan gradient in accordance with a probability distribution to generate modified card-scan gradients. The card-scan system can utilize the modified card-scan gradients to improve the prediction accuracy of the card-scan machine learning model. Because models cannot realistically predict every character-bearing-card type or every visual variation of character-bearing cards (e.g., different brands of payment cards or driver licenses from different states) that the card-scan system will analyze in the future, the card-scan system can generate these modified card-scan gradients as a family of possible mistakes that the card-scan machine learning model could make in predicting card characters for more robust future predictions.

For instance, the card-scan system can generate active-learning metrics for the modified card-scan gradients utilizing the card-scan machine learning model. In some embodiments, the card-scan system generates active-learning metrics by comparing classification-uncertainty metrics and localization-tightness metrics that the card-scan machine learning model utilizes the predict card characters. For example, the card-scan system combines classification-uncertainty metrics into aggregated-classification-uncertainty metrics and combines localization-tightness metrics into aggregated-localization-tightness metrics for comparison.

From the aggregated-classification-uncertainty metrics and the aggregated-localization-tightness metrics, the card-scan system can generate active learning metrics to indicate a measure of prediction improvement for the card-scan machine learning model. As part of comparing an aggregated-classification-uncertainty metric and an aggregated-localization-tightness metric, in some embodiments, the card-scan system utilizes a learning-modification weight to balance an effect of the aggregated-classification-uncertainty metric and the aggregated-localization-tightness metric on an active-learning metric. Based on the active-learning metrics, the card-scan system can rank modified card-scan gradients relative to each other, based on their respective measures of informativeness, or respective measures of how much the given card-scan gradients are predicted to improve the prediction accuracy of the card-scan machine learning model.

Additionally, the card-scan system can label the modified card-scan gradients (or the card images corresponding to the modified card-scan gradients) to indicate the correct card characters. In some embodiments, the card-scan system provides low-entropy (or lower-ranked) card-scan gradients to an automatic labeling system and provides high-entropy (or higher-ranked) card-scan gradients to a labeling service or for visualization within a labeling interface. Additionally, the card-scan system can retrain the card-scan machine learning model using the newly labeled card-scan gradients (as well as other correctly labeled card-scan gradients) to improve the prediction accuracy of the card-scan machine learning model. Further, the card-scan system can deploy or provide the updated card-scan machine learning model to a client device as part of a client application.

In addition to identifying card characters utilizing a card-scan machine learning model, the card-scan system can further utilize the card-scan machine learning model to determine authenticity or "liveness" of a character-bearing card. To elaborate, the card-scan system can determine whether or not a set of card images is captured from a physical, three-dimensional character-bearing card (as opposed to a photograph of a character-bearing card). For instance, the card-scan system can determine that a captured set of card images represents a three-dimensional aspect of a character-bearing card (e.g., by depicting a flip or a rotation of the character-bearing card). Additionally, the card-scan system can utilize the card-scan machine learning model to detect the presence of certain objects on a character-bearing card, such as a chip, a logo, or a hologram to provide further integrity validation. In some embodiments, the card-scan system obfuscates card characters to avoid storing sensitive information that might be susceptible to malicious actors or inadvertent dissemination.

As mentioned above, conventional card-character-detection systems exhibit a number of disadvantages, especially with regard to accuracy, data security, and efficiency. For example, conventional card-character-detection systems often inaccurately identify card characters from character-bearing cards. Particularly, many conventional card-character-detection systems produce frequent, repeating errors in predictions for card characters (e.g., by repeatedly mistaking a "6" for an "8"). Indeed, these conventional card-character-detection systems utilize inaccurate prediction techniques and often do not update metrics associated with these prediction techniques with sufficient frequency to maintain a high level of accuracy.

In addition to their inaccuracy, many conventional card-character-detection systems insecurely capture or transmit sensitive numbers, names, or other character-bearing-card information. For example, many conventional systems cannot remotely verify or authenticate the use of physical payment cards over a network, and instead rely on alternative authentication techniques to verify payment information. Some conventional card-character-detection systems, for instance, utilize transaction verification processes such as two-factor authentication or security questions, where the presence of a physical character-bearing card is never verified. While such techniques can provide increased security over older systems, and can prevent fraudulent activity in many cases, more robust security options are desirable to, for instance, facilitate card-present virtual transactions over networks for additional security.

Due at least in part to their inaccuracy in predicting card characters, conventional card-character-detection systems often inefficiently utilize computing resources to navigate through graphical user interfaces. Specifically, many conventional card-character-detection systems process excessive numbers of user interactions input via user interfaces, which ties up computing resources such as processing time, processing power, and memory. Indeed, some conventional systems require users to navigate through multiples user interfaces to correct frequent, repeated errors in characters generated by the conventional systems. Processing the excessive numbers of user interactions of these conventional systems wastes time and computing resources. These problems are amplified even further in conventional systems when operating on mobile devices, where screen size is limited, thereby requiring additional navigational input from a user to scroll, swipe, or click through additional user interfaces to locate and edit incorrectly predicted characters.

As suggested above, the disclosed card-scan system provides several advantages and benefits over conventional card-character-detection systems. For instance, the disclosed card-scan system can improve the accuracy of predicting card characters as compared to conventional card-character-detection systems. In particular, the card-scan system utilizes an active learning technique to improve predictions of a card-scan machine learning model with both positive and negative examples. As part of the active learning, in some cases, the card-scan system generates active-learning metrics that indicate how informative user-entered character corrections (or the corresponding card-scan gradients) will be in improving the prediction accuracy of the card-scan machine learning model. Indeed, in some embodiments, the card-scan system generates active-learning metrics based on classification-uncertainty metrics, localization-tightness metrics, and/or learning-modification weights. The card-scan system further updates the card-scan machine learning model based on the active-learning metrics. Thus, as opposed to conventional systems that are fixed to inaccurate prediction metrics, the card-scan system can receive corrections from client devices to continuously improve the prediction accuracy of the card-scan machine learning model for periodic deployment to the client devices.

Beyond improving accuracy and efficiency, the card-scan system can further improve data security over that of conventional card-character-detection systems. Conventional systems often cannot train card-character-detection models directly on sensitive card information because such information is encrypted or inaccessible to comply with a Payment Card Industry ("PCI") Data Security Standard ("DSS," together "PCIDSS"). Generating sufficient numbers of synthetic ground-truth character-bearing cards has proven impractical, time consuming, and computing intensive. Without access to real or synthetic ground-truth card information, conventional systems cannot accurately train card-character-detection models. The card-scan system avoids using such sensitive information and preserves the data security of card characters by using card-scan gradients to train the card-scan machine learning model instead of card images or strings of card characters. Indeed, rather than training the card-scan machine learning model on card images directly, the card-scan system generates card-scan gradients representing corrections made to predicted card characters to use as a basis for training the card-scan machine learning model.

Additionally, whereas conventional systems often cannot verify the use of a physical character-bearing card remotely over a network, in certain implementations, the card-scan system can verify the authenticity and integrity of a physical, three-dimensional character-bearing card. For example, in some embodiments, the card-scan system utilizes the card-scan machine learning model to determine three-dimensional movement (e.g., rotation or flipping) of a character-bearing card from a set of card images that depicts such movement (e.g., as a recording of a user flipping the card from front to back). In addition, in some embodiments, the card-scan system detects certain objects, such as holograms or chips on character-bearing cards. Combined with a verification of card characters, the card-scan system identifies these objects and three-dimensional movement to verify or authenticate that the captured set of card images corresponds to a physical, three-dimensional character-bearing card. Thus, while many conventional systems rely on alternative verification techniques and cannot verify the presence of a physical character-bearing card, the card-scan system provides improved data security for remote network transactions by verifying the use of a physical character-bearing card.

In addition to improving accuracy or data security, the card-scan system can also improve efficiency of entering, accessing, and editing data within graphical user interfaces, as compared to conventional systems. Compared to conventional systems that require manual entry of card information, the card-scan system requires fewer user interactions by automatically identifying card characters from a set of card images. As noted above, the card-scan system automatically identifies card characters with increased accuracy as a result of updating a card-scan machine learning model based on active-learning metrics. In addition, compared to conventional systems that inaccurately identify card characters (and that therefore require extensive user input to edit the card characters), the card-scan system reduces user interactions by requiring fewer edits as a result of more accurate card character predictions. Such reduced user interactions result from updating a card-scan machine learning model based on active-learning metrics. By requiring fewer user interactions within card interfaces, the card-scan system thus utilizes fewer computing resources to process such user interactions, including processing time, processing power, and memory.

As a further advantage in terms of efficiency, the card-scan system requires fewer computing resources to update the card-scan machine learning model compared to conventional card-character-detection systems. Some conventional systems perform wholesale retraining of a neural network to re-establish new prediction metrics with each retraining. Repeated training and retraining in this sense is time consuming and computationally expensive. By comparison, the card-scan system employs active learning to leverage the current knowledge, or the current prediction heuristic, of the card-scan machine learning model to improve upon as a baseline, thereby reducing the cost and time involved in improving prediction accuracy. For example, in some embodiments, the card-scan system uses a character-recognition model or symbol-recognition model from another context as an initial version of a card-scan machine learning model, determines active-learning metrics based on card-scan gradients, and updates the card-scan machine learning model based on such active-learning metrics.

As indicated by the foregoing discussion, the present disclosure utilizes a variety of terms to describe features and advantages of the card-scan system. For example, as used herein, the term "character-bearing card" refers to a physical card the includes or depicts characters, including letters or numbers. In some cases, a character-bearing card includes letters or numbers representing personal, private, sensitive, or secure information, such as a name, a code, or a series of numbers. For instance, a character-bearing card can include, but is not limited to, a payment card (e.g., credit card, debit card), a driver's license, a government-identification card, a security-authorization card, or a school-identification card.

Relatedly, the term "card image" or "character-bearing-card image" refers to a digital image or a digital depiction of a character-bearing card. A card image can include a digital image of a character-bearing card captured by a mobile device. Thus, a "set of card images" refers to multiple card images taken together of a single character-bearing card. For example, a set of card images can refer to a digital video or a digital moving image of a character-bearing card. A set of card images can include a particular number of card images (or frames), such as 100 frames, 150 frames, or 200 frames. In some embodiments, a set of card images reflects or captures three-dimensional movement of a character-bearing card, such as a translation of the character-bearing card, a flip of the character-bearing card, a rotation of the character-bearing card, or a dilation of the character-bearing card.

From a set of card images, the card-scan system can identify or predict card characters. As used herein, the term "card character" refers to a digit, a number, a letter, or a symbol that the card-scan system identifies on a character-bearing card. For example, the card-scan system can identify different words on a character-bearing card (e.g., a payment card or a driver license), such as a first name and a last name. Within the first name and the last name, the card-scan system can further identify or predict card characters that make up the individual words (e.g., the first name and the last name).

To identify card characters from a set of card images, the card-scan system can utilize a card-scan machine learning model. As used herein, the term "card-scan machine learning model" refers to a model of one or more computer algorithms that can predict card characters. In some cases, for instance, a card-scan machine learning model includes a neural network that can be tuned (e.g., trained) based on card-scan gradients to predict card characters. In addition, in some embodiments, a card-scan machine learning model can authenticate or verify a physical, three-dimensional character-bearing card. A card-scan machine learning model can have a particular machine learning architecture that includes branches of a decision tree, neurons and layers of a neural network, or other constituent components of different types of machine learning models, such as a scanner algorithm, an optical-field detector, and an object-detection algorithm. A card-scan machine learning model can also include tunable parameters, such as internal weights and relationships that are specific to the type of architecture and that are learned via training or tuning the model.

Example machine learning models that can make up all or a portion of the card-scan machine learning model include, but are not limited to, support vector machines ("SVMs"), random forest algorithms, decision trees, autoencoders, and neural networks (e.g., convolutional neural networks, recurrent neural networks, generative adversarial neural networks, or graph neural networks). For example, a machine learning model can refer to a neural network that includes an algorithm (or a set of algorithms) that implements deep learning techniques to model high-level abstractions in data. In particular, a neural network can include a model of interconnected artificial neurons (e.g., organized in layers)

that communicate and learn to approximate complex functions and generate outputs based on a plurality of inputs provided to the model.

Utilizing the card-scan machine learning model, the card-scan system can generate active learning metrics for various card-scan gradients. As used herein, the term "card-scan gradient" refers to one or more tensors, vectors, or matrices that indicate or represent a gradient and that comprise features that reflects or indicates card characters or other character-bearing-card information corresponding to a set of card images. Indeed, a card-scan gradient can include a gradient that includes n dimensions (e.g., seven dimensions) of features for observable characteristics of a character-bearing card, including card characters. Additionally (or alternatively), features of a card-scan gradient can include latent features and/or multidimensional deep features that are unobservable or imperceptible.

In some embodiments, a card-scan gradient can be labeled as "positive" (e.g., correct) or "negative" (e.g., incorrect) to indicated whether the card-scan machine learning model correctly or incorrectly predicted each of the card characters. In these or other embodiments, a card-scan gradient (e.g., a negative card-scan gradient) can include features that represent or indicate one or more corrections made to predicted card characters a set of card images. For example, the card-scan system might incorrectly identify an "8" as a "6," which causes the user to edit the mistake and which results in a card-scan gradient that reflects the correction. Indeed, in some cases, a card-scan gradient can encapsulate or indicate a severity of a correction as well as a frequency of the correction.

From a card-scan gradient (e.g., a negative card-scan gradient), the card-scan system can generate a plurality of modified card-scan gradients. In particular, the card-scan system can generate modified card-scan gradients to represent a family of possible mistakes that the card-scan machine learning model could make based on one or more corrections indicated within the initial card-scan gradient. As used herein, the term "modified card-scan gradient" refers to a modified version of a card-scan gradient comprising one or more modified or perturbed values or dimensions. For example, a modified card-scan gradient can include values representing features that are modified or perturbed according to a probability distribution. Thus, for a given card-scan gradient (e.g., a negative card-scan gradient) for which corrections have been made to fix incorrect predictions of the card characters, the card-scan system can generate many (e.g., thousands of) modified card-scan gradients.

As suggested, the card-scan system can generate an active-learning metric for a modified card-scan gradient. As used herein, the term "active-learning metric" refers to a metric that indicates an informativeness of a card-scan gradient (e.g., a modified card-scan gradient), or a predicted measure of improvement in prediction accuracy for the card-scan model attributed to the card-scan gradient. Indeed, in certain embodiments, an active learning metric indicates a predicted measure of the card-scan machine learning model generating more accurate card-character predictions utilizing the card-scan gradient (or modified card-scan gradients).

In some embodiments, the card-scan system determines an active learning metric that is composed of multiple constituent machine learning metrics, such as a plurality of classification-uncertainty metrics and a plurality of localization-tightness metrics. As used here, the term "classification-uncertainty metric" refers to a measure of confidence that a predicted card character is correct (or incorrect). For example, a classification-uncertainty metric for a given card character can include scores representing (or a comparison between) a highest-ranked card-character class and a next-highest-ranked card-character class. In addition, the term "aggregated-classification-uncertainty metric" refers to a combination of two or more classification-uncertainty metrics. For example, an aggregated-classification-uncertainty metric can refer to an average of classification-uncertainty metrics, a sum of classification-uncertainty metrics, or a maximum metric from among classification-uncertainty metrics.

Additionally, the term "localization-tightness metric" refers to a tightness or a closeness of predicted locations for card characters. In particular, a localization-tightness metric can refer to a tightness or closeness of a bounding box enclosing a card character. In addition, the term "aggregated-localization-tightness metric" refers to a combination of two or more localization-tightness metrics. For example, an aggregated-localization-tightness metric can refer to an average of localization-tightness metrics, a sum of localization-tightness metrics, or a maximum metric from among localization-tightness metrics.

In some embodiments, the card-scan system can utilize a learning-modification weight as part of an active-learning metric to modify how the card-scan machine learning model learns on successive update iterations, depending factors such as a learning rate of the card-scan machine learning model. Indeed, the card-scan system can combine the aggregated-classification-uncertainty metric and the aggregated-localization-tightness metric in accordance with a learning-modification weight. As used herein, the term "learning-modification weight" refers to a weight or a metric that balances an effect of the classification-uncertainty metric or the localization-tightness metric on an active-learning metric. For example, a learning-modification weight can refer to a weight applied to the aggregated-localization-tightness metric that increases or decreases an emphasis for the aggregated-localization-tightness metric in relation to the aggregated-classification-uncertainty metric in generating an active-learning metric.

As mentioned above, the card-scan system can generate a card-scan machine learning model by modifying a loss function of a traffic-sign machine learning model. In particular, the card-scan system can modify a loss function of a traffic-sign machine learning model to reduce a subtraction space associated with generating predictions for traffic-sign characters and card characters utilizing the traffic-sign machine learning model. As used herein, the term "traffic-sign machine learning model" refers to a machine learning model (like the card-scan machine learning model) that generates predictions of characters on traffic signs. Relatedly, the term "subtraction space" refers to a space the represents or reflects a comparison of two feature spaces. For example, a subtraction space can reflect a comparison between a feature space of features generated for traffic-sign characters and a feature space of feature generated for card characters. A subtraction space can be high-dimensional to represent many features generated by the traffic-sign machine learning model.

Additional detail regarding the card-scan system will now be provided with reference to the figures. In particular, FIG. 1 illustrates a block diagram of a system environment for implementing a card-scan system 104 in accordance with one or more embodiments. As shown in FIG. 1, the environment includes server(s) 106 housing the card-scan system 104. In some embodiments, the card-scan system 104 is part of a transportation matching system 102, while in other embodiments, the card-scan system 104 constitutes a separate or independent system is part of a different system. The environment of FIG. 1 further includes a client device 108 (including a client application 110), a database 114, and a network 112. The server(s) 106 can include one or more computing devices to implement the card-scan system 104. The client device 108 may comprise any computing device as described in relation to FIGS. 10-11. Additional description regarding the illustrated computing devices (e.g., the server(s) 106 and/or the client device 108) is provided with respect to FIGS. 10-11 below.

As shown, the card-scan system 104 utilizes the network 112 to communicate with the client device 108. The network 112 may comprise any network described in relation to FIGS. 10-11. For example, the card-scan system 104 communicates with the client device 108 to receive and provide data, such as card-scan gradients. Indeed, the card-scan system 104 utilizes a card-scan machine learning model to predict card characters based on card-scan gradients. For example, the card-scan system 104 accesses the card-scan machine learning model from the database 114. Additionally, the card-scan system 104 implements an active learning technique to update the card-scan machine learning model based on positive and negative card-scan gradients. The card-scan system 104 further stores the updated card-scan machine learning model on the database 114 and provides the updated card-scan machine learning model to the client device 108 (e.g., as a downloadable application update).

As indicated by FIG. 1, the client device 108 includes the client application 110. In many embodiments, the card-scan system 104 communicates with the client device 108 through the client application 110 to, for example, receive and provide information, such as card-scan gradients and updated card-scan machine learning models. Indeed, the client device 108 captures a set of card images and utilizes a card-scan machine learning model as part of the client application to generate a card-scan gradient to provide to the card-scan system 104. In some embodiments, the card-scan system 104 receives or identifies a card-scan gradient that indicates corrections made to one or more card characters. In addition, the client device 108 (or the card-scan system 104) utilizes the card-scan machine learning model to verify or authenticate a physical character-bearing card by identifying three-dimensional movement of the character-bearing card, among other factors.

In some embodiments (e.g., embodiments where the card-scan system 104 is part of the transportation matching system 102), the transportation matching system 102 communicates with the client device 108 to match transportation requests received from a requester device with the client device 108. Indeed, the transportation matching system 102 can receive a transportation request from a requester device and can provide request information to the client device 108, such as a requested pickup location, a requester identification (for a requester corresponding to a requester device), and a requested pickup time. In some embodiments, per device settings, the transportation matching system 102 receives device information from the client device 108 such as location coordinates (e.g., latitude, longitude, and/or elevation), orientations or directions, motion information, and indications of provider status (e.g., active or inactive). To facilitate connecting requests with transportation vehicles, in some embodiments, the transportation matching system 102 communicates with the client device 108 (e.g., through a client application 110).

As indicated above, the card-scan system 104 can provide (and/or cause the client device 108 to display or render) visual elements within a graphical user interface associated with the client application 110. For example, the card-scan system 104 can provide a card-scan interface for capturing card images. The card-scan system 104 can further provide a card-information interface for reviewing or editing card characters that are automatically filled based on predictions of a version of the card-scan machine learning model on the client device 108.

Although FIG. 1 illustrates the environment having a particular number and arrangement of components associated with the card-scan system 104, in some embodiments, the environment may include more or fewer components with varying configurations. For example, in some embodiments, the card-scan system 104 can communicate directly with the client device 108, bypassing the network 112. In these or other embodiments, the card-scan system 104 can be housed (entirely on in part) on the client device 108. Additionally, the card-scan system 104 can include or house the database 114 within the server(s) 106 or elsewhere.

Figure 2:
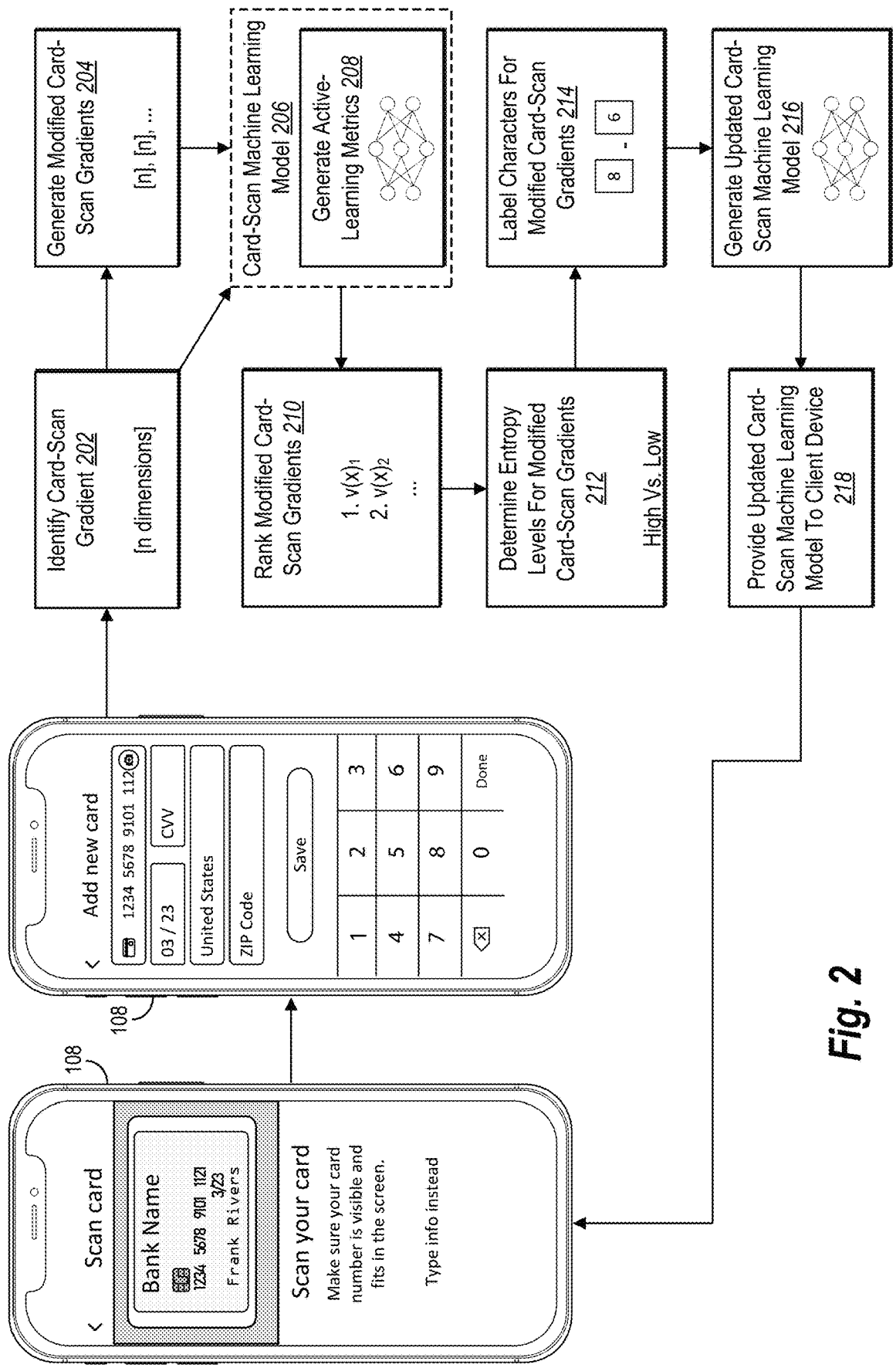
FIG. 2 illustrates an example sequence flow of the card-scan system predicting card characters and updating a card-scan machine learning model in accordance with one or more embodiments.

As mentioned, the card-scan system 104 can identify card characters from a character-bearing card utilizing a card-scan machine learning model. In addition, the card-scan system 104 can improve the accuracy of the card-scan machine learning model through an active learning process. FIG. 2 illustrates an overview of updating a card-scan machine learning model using active learning in accordance with one or more embodiments. Thereafter, the various acts and algorithms overviewed in FIG. 2 are described with reference to subsequent figures.

As illustrated in FIG. 2, the client device 108 captures (or the card-scan system 104 causes the client device 108 to capture) a set of card images. Particularly, the client device 108 captures a video or a moving image of the character-bearing card for "Frank Rivers." From the set of card images, the client device 108 predicts (or the card-scan system 104 causes the client device 108 to predict) card characters utilizing a version of a card-scan machine learning model. As shown, the client device 108 predicts card characters and automatically fills the card characters within a graphical user interface (e.g., a card-information interface with the words "Add new card") for the user to save as a new character-bearing card. To comply with PCIDSS, the client device 108 (or the card-scan system 104) refrains from automatically filling (or predicting) certain card characters such as a Card Verification Value ("CVV") number.

Additionally, the card-scan system 104 performs an act 202 to identify a card-scan gradient. In some embodiments, the card-scan system 104 receives a card-scan gradient generated by the client device 108. In other embodiments, the card-scan system 104 generates a card-scan gradient based on predicted card characters. For instance, in some cases, the card-scan system 104 (or the client device 108) generates a card-scan gradient in the form of a negative card-scan gradient having n dimensions (e.g., seven dimensions) which include features that indicate or reflect one or more corrections made to predicted card characters. In some embodiments, the card-scan system 104 (or the client device 108) predicts card characters incorrectly, whereupon the user fixes or corrects the incorrect predictions. The card-scan system 104 (or the client device 108) thus generates a card-scan gradient indicating these corrections.

As further illustrated in FIG. 2, the card-scan system 104 performs an act 204 to generate modified card-scan gradients. In particular, the card-scan system 104 generates modified card-scan gradients by modifying the received card-scan gradient with minor perturbations (e.g., slight adjustments to features) across the n dimensions. For example, by making many of these minor adjustments to different features in different combinations, the card-scan system 104 generates thousands of modified card-scan gradients from the single initial card-scan gradient. In this way, the card-scan system 104 encapsulates a family of possible mistakes or incorrect predictions that the card-scan machine learning model could make in predicting card characters.

As further shown in FIG. 2, the card-scan system 104 further performs an act 208 to generate active-learning metrics utilizing a card-scan machine learning model 206. Specifically, the card-scan system 104 provides the card-scan gradient and the modified card-scan gradients to the card-scan machine learning model 206. From the card-scan gradient and the modified card-scan gradients, the card-scan system 104 utilizes the card-scan machine learning model 206 to generate active-learning metrics. To elaborate, the card-scan system 104 generates an active-learning metric for each of the modified card-scan gradients. Indeed, the card-scan system 104 utilizes the card-scan machine learning model 206 to generate, for each modified card-scan gradient, an active-learning metric that reflects or indicates a predicted measure of the card-scan machine learning model 206 generating more accurate card-character predictions when trained or updated with the modified card-scan gradient. In some cases, the card-scan system 104 utilizes the card-scan machine learning model 206 to generate an active-learning metric for the card-scan gradient (or other vectors indicating correctly labelled card characters) as well. Additional detail regarding generating the active-learning metrics is provided below with reference to subsequent figures.

As illustrated in FIG. 2, the card-scan system 104 further performs an act 210 to rank the modified card-scan gradients. More specifically, the card-scan system 104 ranks the modified card-scan gradients in accordance with their respective active-learning metrics. For instance, the card-scan system 104 ranks modified card-scan gradients with higher active-learning metrics above those modified card-scan gradients with lower active-learning metrics. Thus, the card-scan system 104 determines which modified card-scan gradients have a higher impact on the learning rate or the prediction improvement of the card-scan machine learning model.

Based on the ranking of the modified card-scan gradients, the card-scan system 104 performs an act 212 to determine entropy levels for the modified card-scan gradients. In particular, the card-scan system 104 determines entropy (e.g., a measure of randomness of the information being processed) for the modified card-scan gradients relative to each other. Indeed, the card-scan system 104 determines entropy levels that reflect how difficult it will be for the card-scan machine learning to generate correct predictions of card characters from the modified card-scan gradients. For example, in some embodiments, the card-scan system 104 divides the modified card-scan gradients into two batches or groups: low entropy and high entropy. Within the high-entropy group, the card-scan system 104 includes a top number or a top percentage of modified card-scan gradients with the highest rankings. Within the low-entropy group, the card-scan system 104 includes the remaining modified card-scan gradients (or a bottom percentage of modified card-scan gradients with rankings). In some embodiments, the card-scan system 104 includes a majority of modified card-scan gradients within the low-entropy group.

After determining entropy levels, the card-scan system 104 further performs an act 214 to label characters for the modified card-scan gradients. To elaborate, the card-scan system 104 labels (or causes to be labeled) the modified card-scan gradients for which one or more card characters have not been identified. To label the modified card-scan gradients, the card-scan system 104 treats high-entropy differently than low-entropy modified card-scan gradients. Indeed, because differences in entropy indicate differences in difficulty for generating correct predictions, the card-scan system 104 utilizes different labeling techniques for modified card-scan gradients within the two entropy groups. For instance, the card-scan system 104 provides modified card-scan gradients with low entropy to an automatic labeling system. The card-scan system 104 thus utilizes or accesses an automatic labeling system that labels the modified card-scan gradients with card characters that correspond to the features of the modified card-scan gradients.

In addition, the card-scan system 104 provides modified card-scan gradients with high entropy to a labeling interface. In some embodiments, the card-scan system 104 provides the high-entropy modified card-scan gradients to a labeling service or for visualization within a labeling interface for humans to label the correct card characters. Indeed, for some high-entropy modified card-scan gradients, an automatic labeling system may be unable to correctly identify the card characters. Thus, the card-scan system 104 utilizes a different labeling service for human labelers to identify the correct characters.

As further illustrated in FIG. 2, the card-scan system 104 performs an act 216 to generate an updated card-scan machine learning model. In particular, the card-scan system 104 updates or retrains the card-scan machine learning model 206 using the newly labeled dataset of modified card-scan gradients and an existing dataset (e.g., card-scan gradients from previous iterations). Indeed, in some cases, the card-scan system 104 utilizes the labeled high-entropy modified card-scan gradients and low-entropy modified card-scan gradients to retrain the card-scan machine learning model 206. Thus, the card-scan system 104 generates an updated card-scan machine learning model 206 with improved prediction accuracy, improving areas where mistakes were previously made while also avoiding forgetting areas where predictions were previously accurate. Indeed, in some embodiments, the card-scan system 104 also retrains the card-scan machine learning model 206 using positive examples of card-scan gradients where the card-scan system 104 correctly predicted card characters.

After updating, the card-scan system 104 performs an act 218 to provide the updated card-scan machine learning model to the client device 108. In some embodiments, the card-scan system 104 stores the updated card-scan machine learning model within a database (e.g., the database 114) as part of an updated iteration of the client application 110. The card-scan system 104 thus updates the client application 110 on the client device by providing (upon download or update of an application) the updated card-scan machine learning model. As shown, in certain implementations, the card-scan system 104 further repeats the process illustrated in FIG. 2, including the acts 202-218 to continuously update and improve the card-scan machine learning model.

As mentioned, the card-scan system 104 can utilize a particular architecture for a card-scan machine learning model. In one or more embodiments, the card-scan system 104 accesses an open source library of machine learning models. For instance, the card-scan system 104 accesses and utilizes a machine learning model from the TensorFlow library. Specifically, in some embodiments, the card-scan system 104 utilizes a card-scan machine learning model in the form of a TensorFlow Model Zoo machine learning model. In these or other embodiments, the card-scan system 104 modifies the TensorFlow Model Zoo machine learning model (e.g., through training and/or architecture modification) to generate a card-scan machine learning model having a certain architecture suitable for identifying characters on cards.

Figure 3:
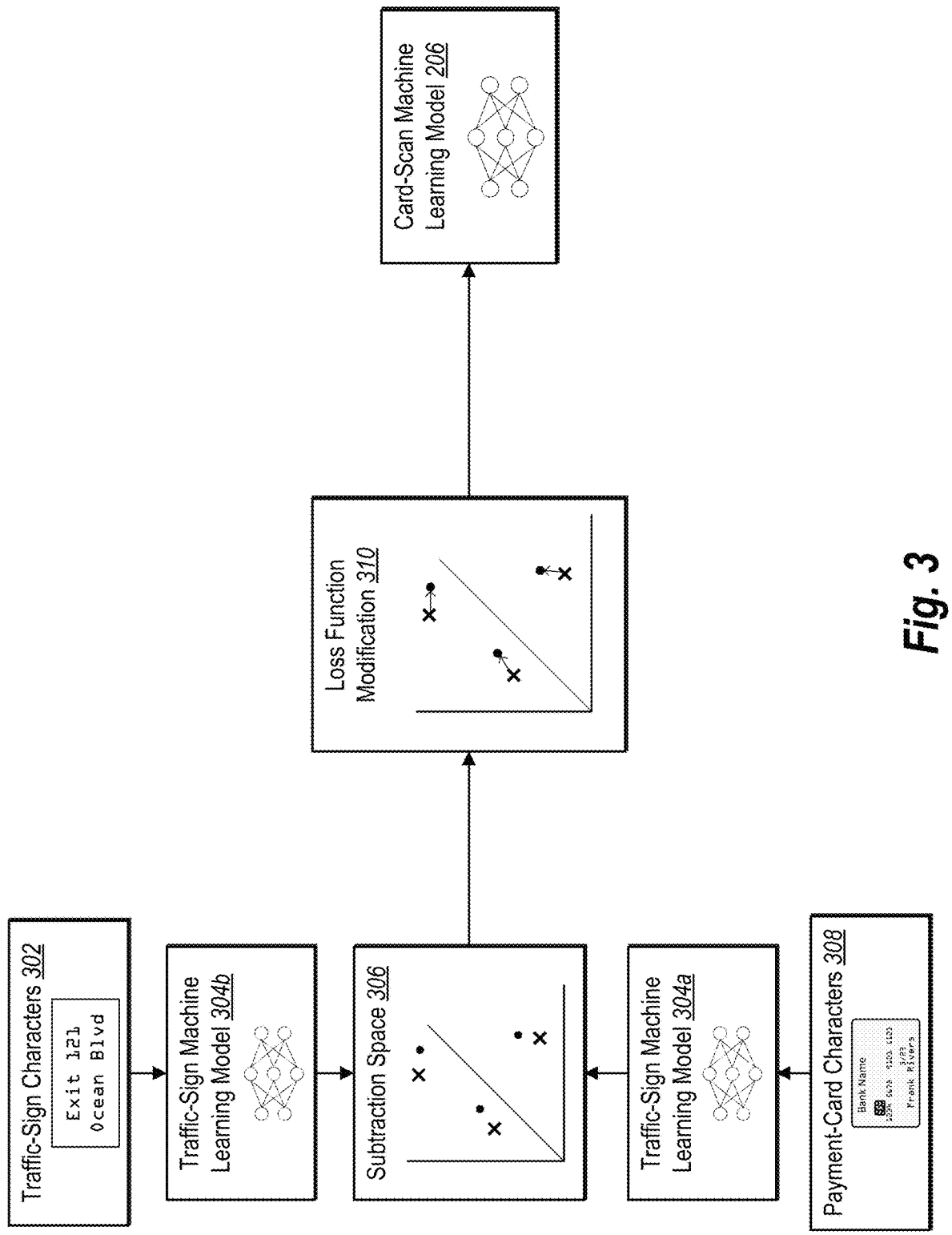
FIG. 3 illustrates an example sequence of acts for generating a version of a card-scan machine learning model in accordance with one or more embodiments.

As suggested above, the card-scan system 104 can generate an initial version of a card-scan machine learning model based on a machine learning model from another context for character or symbol recognition. In some embodiments, for example, the card-scan system 104 can generate an initial version of a card-scan machine learning model by modifying a loss function of a traffic-sign machine learning model. FIG. 3 illustrates an example process for generating an initial version of the card-scan machine learning model 206 in accordance with one or more embodiments. While the following paragraphs us the traffic-sign machine learning model as an example, the card-scan system 104 can also use machine learning models for logo detection, infographics, or other graphic or optical character recognition.

As illustrated in FIG. 3, the card-scan system 104 accesses and utilizes a traffic-sign machine learning model as a baseline for generating the card-scan machine learning model 206. To elaborate, the card-scan system 104 inputs traffic-sign characters 302 into a traffic-sign machine learning model 304b, whereupon the traffic-sign machine learning model 304b generates feature vectors for the traffic-sign characters 302. Indeed, as illustrated in FIG. 3, the feature vectors for the traffic-sign characters 302 are represented by dots plotted at different locations within the subtraction space 306. Although FIG. 3 illustrates the subtraction space 306 having three dimensions, this is merely illustrative for discussion purposes, and the subtraction space 306 can have more or fewer dimensions.

As further illustrated in FIG. 3, the card-scan system 104 inputs card characters 308 into a traffic-sign machine learning model 304a. The traffic-sign machine learning model 304a thus generates feature vectors for the card characters 308. As illustrated, the feature vectors for the card characters 308 are represented by the "x" symbols in the subtraction space 306. Because traffic signs and character-bearing cards have different dimensions and other differences in appearance, the traffic-sign machine learning model 304a may not generate feature vectors that accurately predict or represent card characters. Indeed, the traffic-sign machine learning models 304a and 304b are trained on traffic-sign data and predict traffic-sign characters. Utilizing the traffic-sign machine learning model 304a to generate card characters from a character-bearing card thus results in less accurate predictions.

To tailor or modify the traffic-sign machine learning model 304a (and to thereby generate the card-scan machine learning model 206), the card-scan system 104 modifies a loss function associated with the traffic-sign machine learning model 304a. As illustrated in FIG. 3, for instance, the card-scan system 104 performs a loss function modification 310 to reduce the subtraction space 306. To elaborate, the card-scan system 104 compares the feature vectors for the traffic-sign characters 302 and the feature vectors for the card characters 308 to generate the subtraction space 306 which represents the differences between the different feature vectors. Indeed, as illustrated, the feature vectors for the traffic-sign characters 302 and the feature vectors for the card characters 308 do not align in feature space.

To obtain more accurate approximations, the card-scan system 104 modifies the loss function (e.g., by increasing the dimensions of the card images) to reduce the subtraction space 306, bringing the generated feature vectors for the different types of input data closer together. Thus, the card-scan system 104 generates the card-scan machine learning model 206 by modifying the loss function so that the new card-scan machine learning model 206 generates more accurate predictions of card characters, even though the model is trained on traffic-sign data.

Figure 4:
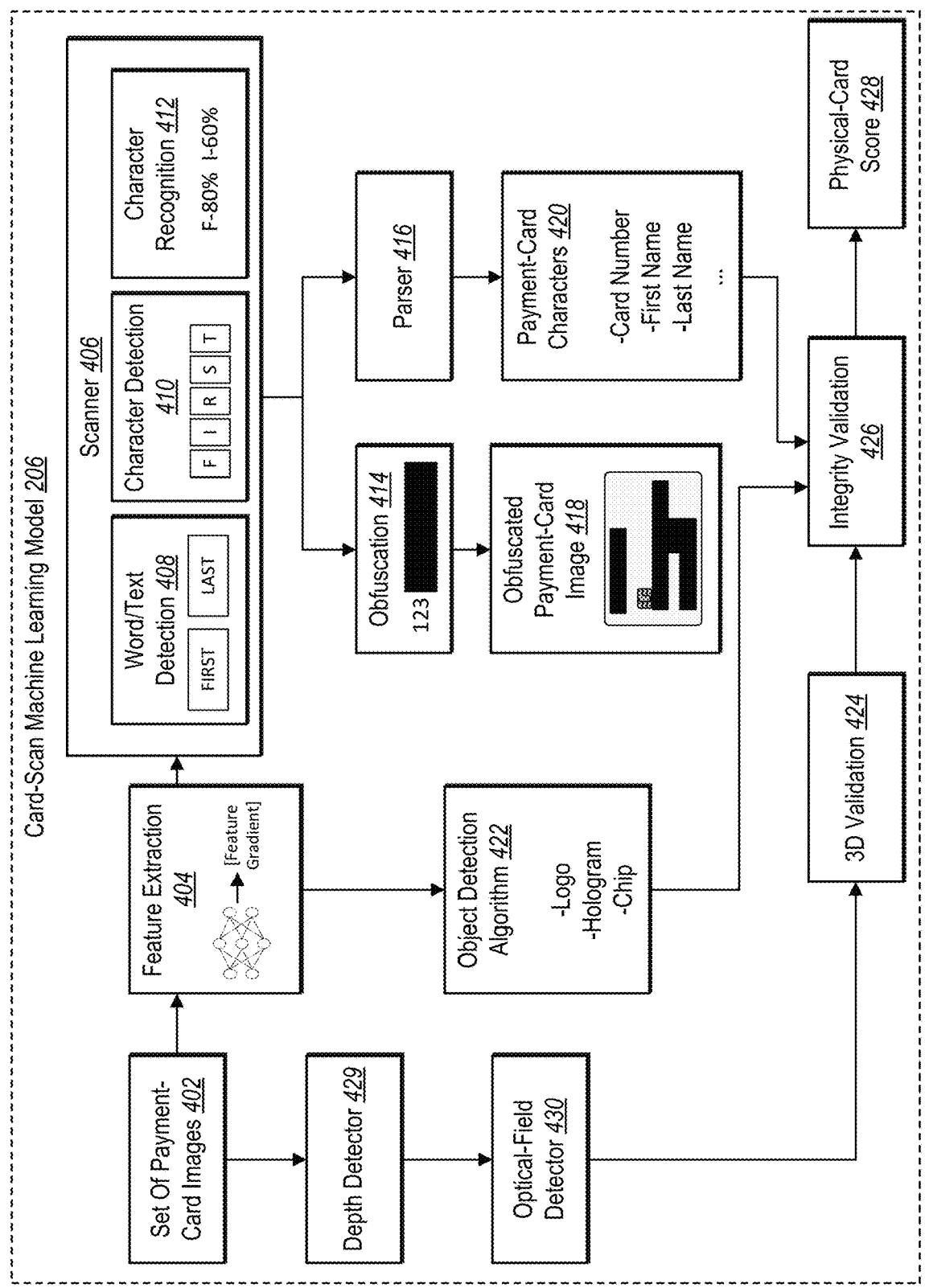
FIG. 4 illustrates an example architecture for a card-scan machine learning model in accordance with one or more embodiments.

As mentioned above, the card-scan system 104 can utilize a card-scan machine learning model (e.g., the card-scan machine learning model 206) to predict card characters from a set of card images. As also mentioned, the card-scan system 104 can utilize components of the card-scan machine learning model 206 to verify or authenticate a physical character-bearing card. FIG. 4 illustrates an example architecture of the card-scan machine learning model 206 for performing these tasks in accordance with one or more embodiments.

As illustrated in FIG. 4, the card-scan machine learning model 206 takes a set of card images 402 as input. From the set of card images 402, the card-scan machine learning model 206 generates an output in the form of a card number, an expiration date, a first name, a last name, a length of CVV number, a physical-card score, and a downsampled set of obfuscated card images. Indeed, the card-scan machine learning model 206 (as part of the card-scan system 104 or as part of the client device 108) identifies or predicts card characters, validates the integrity of a physical character-bearing card, and obfuscates sensitive information (e.g., one or more card characters). To accomplish these ends, the card-scan machine learning model 206 includes various constituent components as shown in FIG. 4 and described hereafter.

For example, the card-scan machine learning model 206 implements a feature extraction 404. More specifically, the card-scan machine learning model 206 extracts features from the set of card images 402. In some embodiments, the card-scan machine learning model 206 implements the feature extraction 404 utilizing a particular feature extractor algorithm such as an encoder neural network, a principal component analysis, an independent component analysis, or a linear discriminant analysis. Using the feature extraction 404, the card-scan machine learning model 206 extracts features that represent the set of card images 402 with feature vectors. The card-scan machine learning model 206 further utilizes the extracted feature vectors to predict card characters and to validate the integrity of a physical character-bearing card.

More specifically, the card-scan machine learning model 206 inputs the extracted feature vectors into a scanner 406. The scanner 406 is a subcomponent of the card-scan machine learning model 206 and refers to a machine learning model, such as a neural network (e.g., a Faster Region-Based Convolutional Neural Network or "Faster-RCNN") that includes layers or other constituent components for word/text detection 408, character detection 410, and character recognition 412. Indeed, the card-scan machine learning model 206 performs the word/text detection 408 to the identify words or other groups of characters from the extracted features. For example, the card-scan machine learning model 206 identifies groups of characters that correspond to a first name and a last name on a character-bearing card depicted in the set of card images 402. In some embodiments, the card-scan machine learning model 206 delineates between words or groups of characters with bounding boxes to enclose the different words, without yet identifying the characters themselves.

In addition, the card-scan machine learning model 206 performs the character detection 410 to detect or identify locations of individual characters within the identified words or groups of characters. For example, the card-scan machine learning model 206 processes the extracted features to identify locations of, but does not yet determine the identities for, individual characters such as "F," "I," "R," "S," and "T" within the word "FIRST." Indeed, the card-scan machine learning model 206 generates bounding boxes to enclose, and delineate between, individual characters within the identified words. In particular, the card-scan machine learning model 206 generates the bounding boxes in accordance with localization-tightness metrics.

Further, the card-scan machine learning model 206 performs that character recognition 412 to predict or determine identities of individual characters. For instance, the card-scan machine learning model 206 processes the extracted features to generate respective probabilities for bounded characters corresponding to different character categories or classes. As shown in FIG. 4, for instance, the card-scan machine learning model 206 determines an 80% probability that the first character (the "F" in "FIRST") identified belongs to the "F" category. The card-scan machine learning model 206 also determines other probabilities that the first character could belong to other character categories well, in accordance with the weights and parameters of the card-scan machine learning model 206.

Likewise, the card-scan machine learning model 206 generates probabilities that the second character (the "I" in "FIRST") belongs to the "I" category as well as other categories. As the card-scan system 104 retrains and updates the card-scan machine learning model 206, the card-scan system 104 modifies various weights and parameters to adjust the generation of bounding boxes and the prediction of characters. Additional detail regarding retraining and updating parameters to improve card character predictions is provided below with reference to subsequent figures.

As further shown in FIG. 4, the card-scan machine learning model 206 includes a parser 416. In particular, the card-scan machine learning model 206 utilizes the parser 416 to parse the identified characters and classify card characters 420 into different categories. More specifically, the card-scan machine learning model 206 identifies which of the card characters 420 correspond to which types of information on a character-bearing card. For example, in some embodiments, the card-scan machine learning model 206 organizes the card characters 420 into a card number, a first name, a last name, an expiration date, and a CVV number from characters predicted by the scanner 406.

In addition to the parser 416, the card-scan machine learning model 206 includes an object detection algorithm 422. Particularly, the card-scan machine learning model 206 implements the object detection algorithm 422 in the form of a neural network or other machine learning model that detects or recognizes certain objects from the set of card images 402. For instance, the card-scan machine learning model 206 utilizes the object detection algorithm 422 to process extracted features (from the feature extraction 404) and identify objects shown on a character-bearing card. The card-scan machine learning model 206 can thus detect objects, such as a logo, a hologram, or a chip on the character-bearing card.

As further shown in FIG. 4, the card-scan machine learning model 206 further utilizes a 3D validation algorithm 424 as part of an integrity validation 426. More specifically, the card-scan machine learning model 206 determines that the character-bearing card depicted in the set of card images 402 is a three-dimensional object by performing the 3D validation algorithm 424. For instance, in some embodiments, the card-scan machine learning model 206 utilizes a depth detector 429 and an optical-field detector 430. In some cases, the card-scan machine learning model 206 utilizes the depth detector 429 to determine depths of one or more portions of a character-bearing card. For example, the depth detector 429 identifies corners, edges, and/or surfaces of a character-bearing card. In addition, the depth detector 429 determines distances of the corners, edges, and/or surfaces from the client device 108. In some cases, the depth detector 429 determines the distances, or the depths, of different portions of a character-bearing card utilizing one or more sensors, such as a camera, a proximity sensor, and/or a three-dimensional depth sensor.

In the same or other embodiments, the card-scan machine learning model 206 utilizes the optical-field detector 430 to analyze the set of card images 402 to detect or verify three-dimensional movement of the character-bearing card. The card-scan machine learning model 206 thus verifies three-dimensional movement, such as a translation, a rotation, a dilation, or a flip (e.g., from font to back) of the character-bearing card (e.g., as the client device 108 records the user performing the action to the character-bearing card).

In some embodiments, the card-scan machine learning model 206 determines a value for the 3D validation algorithm 424 based on detecting one more three-dimensional movements and/or depths of portions of a card (e.g., via the optical-field detector 430 and the depth detector 429, respectively). The card-scan machine learning model 206 thus determines higher values for more three-dimensional movements detected and/or for more pronounced or clearly identified movements. In certain implementations, the card-scan machine learning model 206 assigns a highest value to a flip movement because of the three-dimensional aspects of the flip movement in viewing multiple sides of the character-bearing card. Due to the three-dimensional aspects of the flip movement, in one or more embodiments, the card-scan machine learning model 206 requires the flip movement to generate a physical-card score 428. Additional detail regarding the 3D validation algorithm 424 is provided below with reference to subsequent figures.

The card-scan machine learning model 206 further utilizes the detected objects and the 3D validation algorithm 424 as part of an integrity validation 426. Indeed, in some embodiments, the card-scan machine learning model 206 generates a physical-card score 428 that indicates a probability or a confidence level that the character-bearing card depicted in the set of card images 402 is a physical, three-dimensional character-bearing card. The card-scan machine learning model 206 considers additional factors for generating the physical-card score 428 as well. For example, in addition to the detected objects, the card-scan machine learning model 206 utilizes the card characters 420 from the parser 416 and a 3D validation algorithm 424 for the integrity validation 426. To maintain PCI compliance, the card-scan machine learning model 206 only utilizes permissible characters (e.g., digits or letters) from the card characters 420 for the integrity validation 426, such as the first six and last four digits of a card number, a first name, a last name, and an expiration date.

To generate the physical-card score 428 through the integrity validation 426, the card-scan machine learning model 206 (i) assigns values to the card characters 420, the object detection algorithm 422, and the 3D validation algorithm 424 and (ii) generates the physical-card score 428 as a combination (e.g., a weighted combination) of the values. In some embodiments, the card-scan machine learning model 206 increases a value for the card characters 420 (thereby increasing the physical-card score 428) for each card character identified from the set of card images 402 (or for each type or category of card characters—card number, first name, last name, or expiration date). Thus, the more card characters 420 the card-scan machine learning model 206 identifies, the higher the physical-card score 428.

In addition, in certain implementations, the card-scan machine learning model 206 increases a value for the object-detection algorithm 422 for each object detected from the set of card images 402. Thus, the card-scan machine learning model 206 increases the physical-card score 428 in cases where the card-scan machine learning model 206 detects a logo, a hologram, and a chip. Conversely, if the card-scan machine learning model 206 does not identify any objects (or identifies fewer objects), the physical-card score 428 is lower. The more objects the card-scan machine learning model 206 identifies, the more likely the character-bearing card is a real, physical card, and therefore the higher the physical-card score 428.

Thus, based on the 3D validation algorithm 424, the object detection algorithm 422, and the card characters 420, the card-scan machine learning model 206 performs the integrity validation 426 to combine each of these metrics into a physical-card score 428. For example, the card-scan machine learning model 206 generates a weighted combination of one or more of a value from the 3D validation algorithm 424, a value from the object detection algorithm 422, and a value from the card characters 420 to generate the physical-card score 428. By utilizing the card-scan machine learning model 206, the card-scan system 104 therefore verifies that the character-bearing card is a physical, three-dimensional character-bearing card based on the physical-card score 428.

Indeed, in certain embodiments, the card-scan system 104 verifies that the character-bearing card is a physical character-bearing card based on the physical-card score 428 satisfying a score threshold. If the card-scan system 104 determines the physical-card score 428 equals or exceeds a score threshold, for example, the card-scan system 104 verifies that the character-bearing card is a physical character-bearing card. By contrast, if the card-scan system 104 determines the physical-card score 428 falls below a score threshold, the card-scan system 104 determines that the character-bearing card is not a physical character-bearing card.

As further illustrated in FIG. 4, in some embodiments, the card-scan machine learning model 206 performs an obfuscation 414. In particular, the card-scan machine learning model 206 obfuscates one or more card characters to prevent storage of, and to protect, sensitive information. For example, the card-scan machine learning model 206 obfuscates the middle eight digits of a card number as well as a CVV number to comply with PCI standards. By obfuscating a portion of the card characters, the card-scan machine learning model 206 generates an obfuscated character-bearing-card image 418 (or an obfuscated set of card images such as a video or a moving image). For example, the card-scan machine learning model 206 generates a character-bearing-card image with obfuscated data so that the card-scan system 104 can store the obfuscated character-bearing-card image 418 (e.g., within the database 114) and avoid storing any sensitive information.

Figure 5:
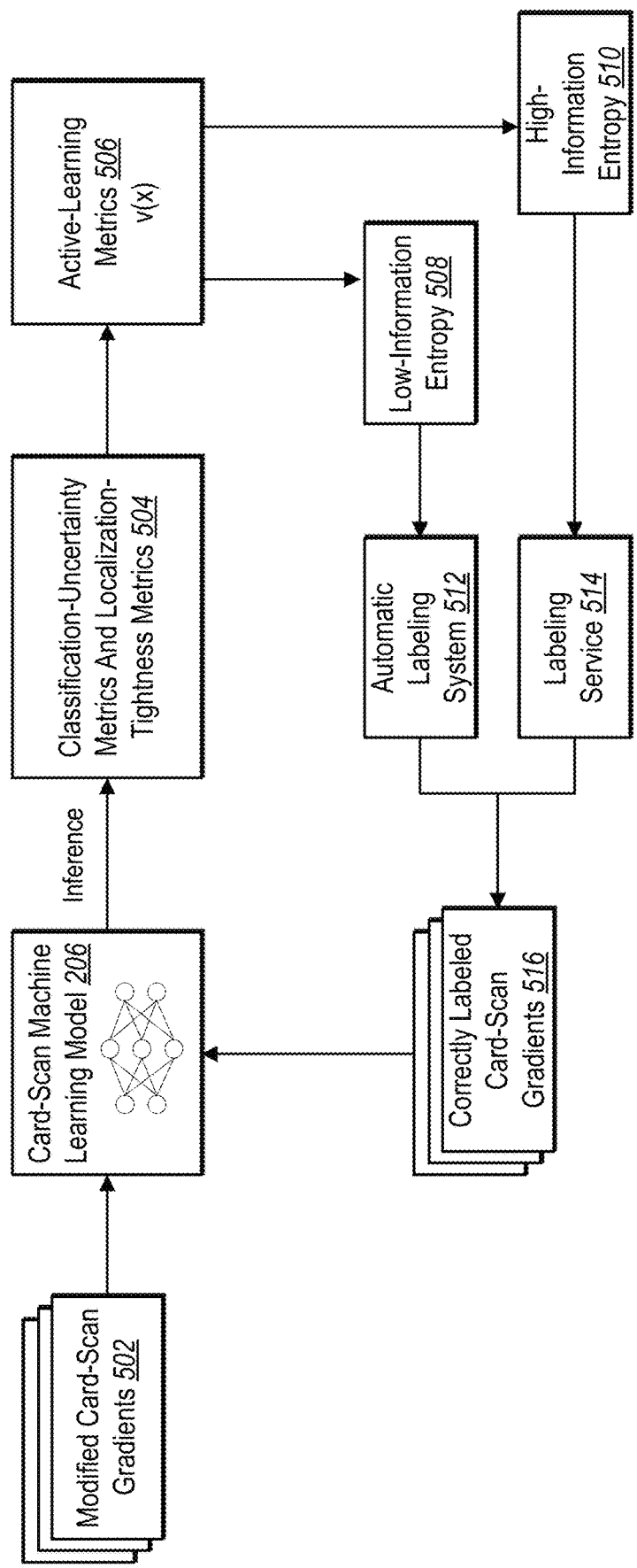
FIG. 5 illustrates an example flow for updating or retraining a card-scan machine learning model in accordance with one or more embodiments.

As mentioned above, the card-scan system 104 can retrain or update the card-scan machine learning model 206 using an active learning technique. In particular, the card-scan system 104 can update the parameters of the card-scan machine learning model 206 based on differences, or deltas, between what the card-scan machine learning model 206 does well and what the card-scan machine learning model 206 predicts incorrectly. Indeed, the card-scan system 104 can train the card-scan machine learning model 206 based on negative examples of incorrectly predicted card characters from card-scan gradients and positive examples of correctly predicted card characters from card-scan gradients. FIG. 5 illustrates an example process for retraining or updating the card-scan machine learning model 206 in accordance with one or more embodiments. In some cases, the card-scan system 104 initially adjusts parameters of a card-scan machine learning model from another source, such as by initially adjusting parameters of a TensorFlow Model Zoo machine learning model.

As illustrated in FIG. 5, the card-scan system 104 accesses one or more modified card-scan gradients 502. As described above, the card-scan system 104 generates the modified card-scan gradients 502 by modifying a card-scan gradient that indicates one or more corrections made to incorrectly predicted card characters. In addition, the card-scan system 104 inputs a modified card-scan gradient into the card-scan machine learning model 206, whereupon the card-scan machine learning model 206 generates an inference or a prediction of card characters corresponding to the modified card-scan gradient.

Based on the inference, the card-scan system 104 determines classification-uncertainty metrics and a localization-tightness metrics 504 associated with the modified card-scan gradient. In particular, the card-scan system 104 determines the classification-uncertainty metrics and the localization-tightness metrics 504 from the output of the card-scan machine learning model 206. Relating to the output of the model, the card-scan machine learning model 206 generates a list of estimated distributions of class scores indicating probabilities of each identified card character corresponding to different characters or classes. In some embodiments, the card-scan machine learning model 206 generates an estimated distribution of class scores p (c|x) over K classes (e.g., K possible character classifications) forMdetections (e.g., M detected characters).

From the output of the card-scan machine learning model 206, the card-scan system 104 determines classification-uncertainty metrics. For example, the card-scan system 104 utilizes margin sampling to analyze the distribution of class scores to determine whether the card-scan machine learning model 206 made an uncertain prediction for any particular characters. For a given detected character of the modified card-scan gradient, the card-scan system 104 determines a classification-uncertainty metric in accordance with the following function:

$$ClassificationUncertainty(x) = \left(1 - *\left(maxp\left(\frac{c_1}{x}\right) - maxp\left(\frac{c_2}{x}\right)\right)\right)^2$$

$$c_1 \in K, c_2 \in K - c_1$$

where $c_1$ and $c_2$ are the two highest-scoring classes (e.g., the two character classes that the card-scan machine learning model 206 assigns the highest score or the highest probability for a given detected character). For instance, the card-scan machine learning model 206 generates a first probability (or score) that a detected character is a "7" and a second probability (or score) that the detected character is a "1." The card-scan system 104 further repeats the determination of the classification-uncertainty metric for other detected characters of the modified card-scan gradient as well.

For the given character of the modified card-scan gradient, the card-scan system 104 also determines a localization-tightness metric. Indeed, the card-scan system 104 determines a localization-tightness metric which indicates a tightness of a bounding box enclosing the character. In some embodiments, the card-scan system 104 generates a localization-tightness metric in accordance with:

$$IoU(B_1, B_2) = \frac{B_1 \cap B_2}{B_1 \cup B_2}$$

where IoU is the intersection over union between a predicted bounding box $B_1$ and an estimated pseudo-ground-truth bounding box $B_2$. The card-scan system 104 generates or determines the estimated pseudo-ground-truth bounding box $B_2$ utilizing another machine learning model. The card-scan system 104 further repeats the determination of the localization-tightness metric for other detected characters of the modified card-scan gradient.

As further illustrated in FIG. 5, the card-scan system 104 generates active-learning metrics for the modified card-scan gradient. In particular, the card-scan system 104 generates an active-learning metric for each of the modified card-scan gradients 502. For a given modified card-scan gradient, for example, the card-scan system 104 determines an active-learning metric based on a plurality of classification-uncertainty metrics and a plurality of localization-tightness metrics corresponding to the individual detected characters of the modified card-scan gradient. More specifically, the card-scan system 104 generates an aggregated-classification-uncertainty metric and an aggregated-localization-tightness metric for the modified card-scan gradient.

For example, the card-scan system 104 generates the aggregated-classification-uncertainty metric by combining classification-uncertainty metrics for each of the individual characters. In some embodiments, the card-scan system 104 generates the aggregated-classification-uncertainty metric by summing the individual classification-uncertainty metrics. In other embodiments, the card-scan system 104 generates the aggregated-classification-uncertainty metric by averaging the individual classification-uncertainty metrics. In still other embodiments, the card-scan system 104 generates the aggregated-classification-uncertainty metric by determining a maximum metric from among the individual classification-uncertainty metrics.

Similarly, the card-scan system 104 generates an aggregated-localization-tightness metric. For example, the card-scan system 104 generates the aggregated-localization-tightness metric by combining the individual localization-tightness metrics. In some cases, the card-scan system 104 generates the aggregated-localization-tightness metric by summing, averaging, or determining a maximum metric from the individual localization-tightness metrics.

Based on the aggregated-classification-uncertainty metric and the aggregated-localization-tightness metric, the card-scan system 104 generates an active-learning metric for the modified card-scan gradient. Specifically, the card-scan system 104 generates the active-learning metric in accordance with the following function:

$$v(x) = \text{AggregClassificationUncertainty}(x) - \lambda * \text{AggregLocalizationTightness}$$

where v(x) represents the active-learning metric for the modified card-scan gradient for a character-bearing-card image x, AggregClassificationUncertainty represents the aggregated-classification-uncertainty metric, AggregLocalizationTightness represents the aggregated-localization-tightness metric, and $\lambda$ represents a learning-modification weight. As indicated, the learning-modification weight $\lambda$ balances an effect of the classification-uncertainty metric or the localization-tightness metric on the active-learning metric by weighting the localization-tightness metric more or less than the classification-uncertainty metric.

In embodiments described herein, the card-scan system 104 determines and redetermines the learning-modification weight, $\lambda$, for each iteration of retraining and updating the card-scan machine learning model 206. More particularly, the card-scan system 104 determines the learning-modification weight based on predication performance of the card-scan machine learning model 206 from a previous iteration. For instance, the card-scan system 104 modifies the learning-modification weight to increase or decrease the weight for the localization-tightness metric to emphasize the localization-tightness metric or the classification-uncertainty metric more in determining the active-learning metric.

In some embodiments, the card-scan system 104 determines a weighted active-learning metric to account for classes that are underrepresented or otherwise unbalanced. To counter the issue of class imbalance and to enable incremental learning, the card-scan system 104 generates a weighted active-learning metric where instances of classes that are underrepresented are preferred, or weighted more heavily. For example, in some embodiments, the card-scan system 104 weights a particular class in accordance with:

$$w_c = \frac{\#\text{instances} + \#\text{classes}}{\#\text{instances} + 1}$$

where $w_c$ represents a weight of a predicted class c, #instances represents the number of instances where the card-scan machine learning model 206 predicted a character to belong to the class c, and #classes represents the total number of possible classes for classifying characters.

As further illustrated in FIG. 5, the card-scan system 104 groups the modified card-scan gradients 502 into two entropy groups: low-information entropy 508 and high-information entropy 510. In particular, the card-scan system 104 generates active-learning metrics for each of the modified card-scan gradients 502 and ranks the modified card-scan gradients 502 according to their respective active-learning metrics. In some cases, the card-scan system 104 ranks vectors with higher active-learning metrics higher and vectors with lower active-learning metrics lower.

Based on such ranking, in certain implementations, the card-scan system 104 separates the card-scan gradients 502 into groups for low-information entropy 508 and high-information entropy 510 by selecting a top-ranked number or percentage of the card-scan gradients 502 to identify as having high-information entropy 510 and identifying the remaining card-scan gradients 502 as having low-information entropy 508. In some embodiments, the card-scan system 104 identifies a majority of the card-scan gradients 502 as low-information entropy 508 and identifies a minority of the card-scan gradients 502 as high-information entropy 510—depending on various entropy-level determinations and the underlying card-scan gradients.

As further indicated by FIG. 5, the card-scan system 104 labels the card-scan gradients 502 based on grouping the card-scan gradients 502 into the different entropy groups. More specifically, the card-scan system 104 labels the modifies card-scan gradients 502 to include correctly labeled card characters. For modified card-scan gradients having low-information entropy 508, the card-scan system 104 utilizes an automatic labeling system 512. For instance, the card-scan system 104 utilizes or accesses an automatic labeling system 512 in the form of a machine learning model or some other (external) system that automatically (e.g., without user input) labels the card characters corresponding to the low-entropy modified card-scan gradients.

For modified card-scan gradients having high-information entropy 510, on the other hand, the card-scan system 104 provides the modified card-scan gradients to a labeling service 514. In some embodiments, the card-scan system 104 provides the high-entropy modified card-scan gradients to a human labeling service where human labelers correctly identify and label the card characters corresponding to the high-entropy card-scan gradients. For instance, the card-scan system 104 can provide the high-entropy modified card-scan gradients for visualization within a labeling interface through which human labelers correctly identify and label the card characters corresponding to the high-entropy card-scan gradients.

As further illustrated in FIG. 5, the card-scan system 104 adds the newly labeled modified card-scan gradients (e.g., those modified card-scan gradients labeled via the automatic labeling system 512 or the labeling service 514) to a set of correctly labeled card-scan gradients 516. The set of correctly labeled card-scan gradients 516 can include other modified card-scan gradients that have been labeled and can also include card-scan gradients for sets of card images for which the card-scan machine learning model 206 correctly predicted card characters. Thus, the card-scan system 104 updates the card-scan machine learning model 206 on positive and negative examples, while also retraining on existing data from previous iterations. Indeed, as shown in FIG. 5, the card-scan system 104 repeats the illustrated process to retrain and update the card-scan machine learning model 206 over different iterations. As a result, the card-scan system 104 incrementally improves the accuracy of the card-scan machine learning model 206 while avoiding problems of forgetting previous training (e.g., catastrophic inference). In some embodiments, the card-scan system 104 updates the card-scan machine learning model 206 based on determining that a predicted improvement in the accuracy of the card-scan machine learning model 206 resulting from the update satisfies a predicted-improvement threshold.

As mentioned, the card-scan system 104 can generate and provide data for display on user interfaces of a client device (e.g., the client device 108). In particular, the card-scan system 104 can generate data for display within user interfaces such as card-scan interface and card-information interface for scanning and editing card characters. FIGS. 6A-6F illustrate various user interfaces for scanning and editing card characters in accordance with one or more embodiments.

Figure 6B:
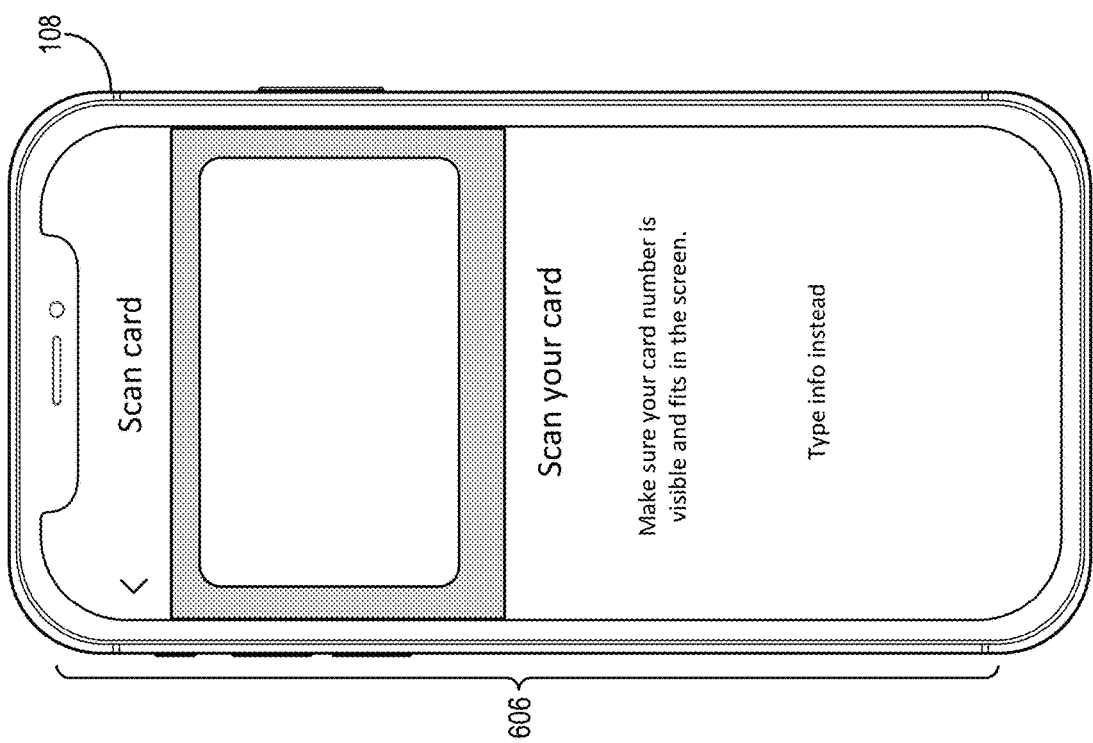
FIGS. 6A-6F illustrate example graphical user interfaces for scanning and editing card characters in accordance with one or more embodiments.
Figure 6A:
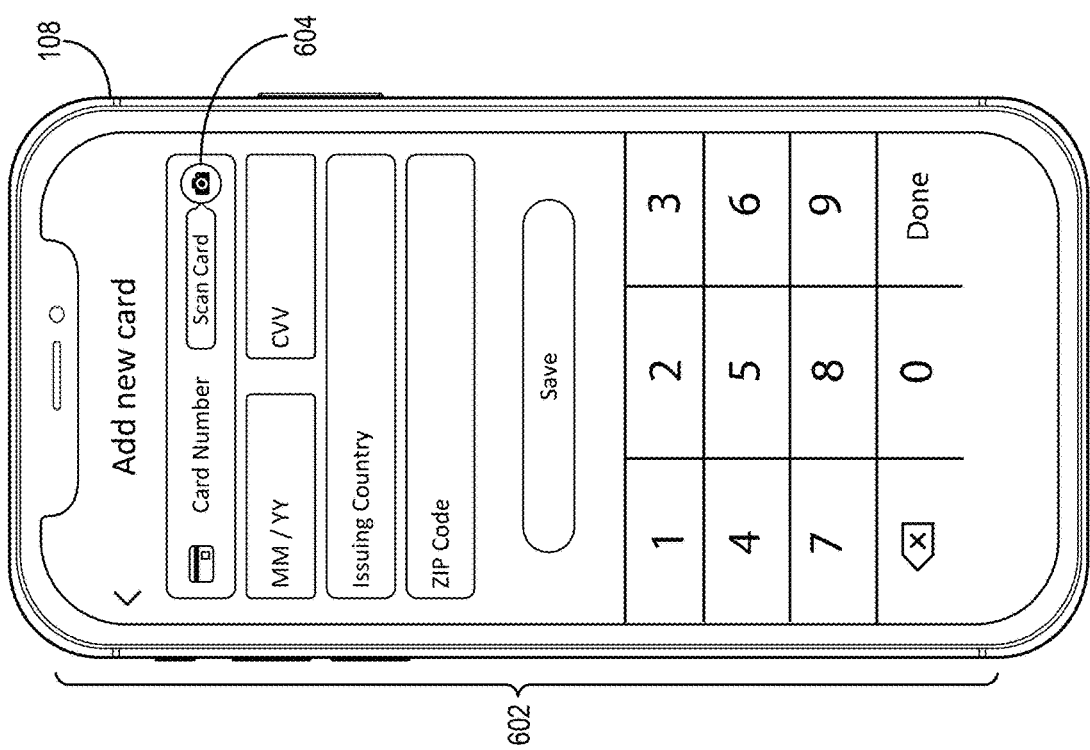

As illustrated in FIG. 6A, the client device 108 displays a card-information interface 602 for entering card information. For example, the card-information interface includes fields for entering a card number, an expiration date, a CVV number, an issuing country, and a ZIP code. Additionally, the card-information interface 602 includes a card-scan option 604 that is selectable to scan a character-bearing card for automatically filling in some or all of the information fields within the card-information interface 602.

In response to an indication of user interaction with the card-scan option 604, the card-scan system 104 provides, or the client device 108 displays, a card-scan interface 606. Indeed, as illustrated in FIG. 6B, the client device 108 displays a card-scan interface 606 that includes a capture box for placing a character-bearing card to extract card characters.

Figure 6D:
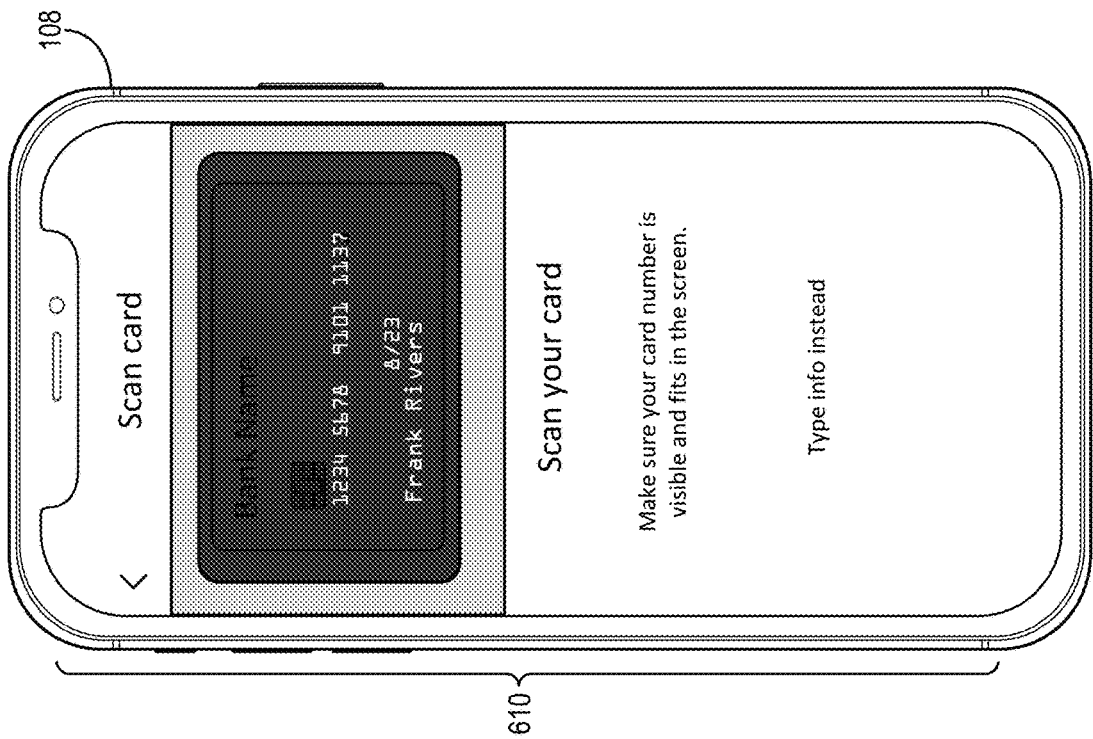
Figure 6C:
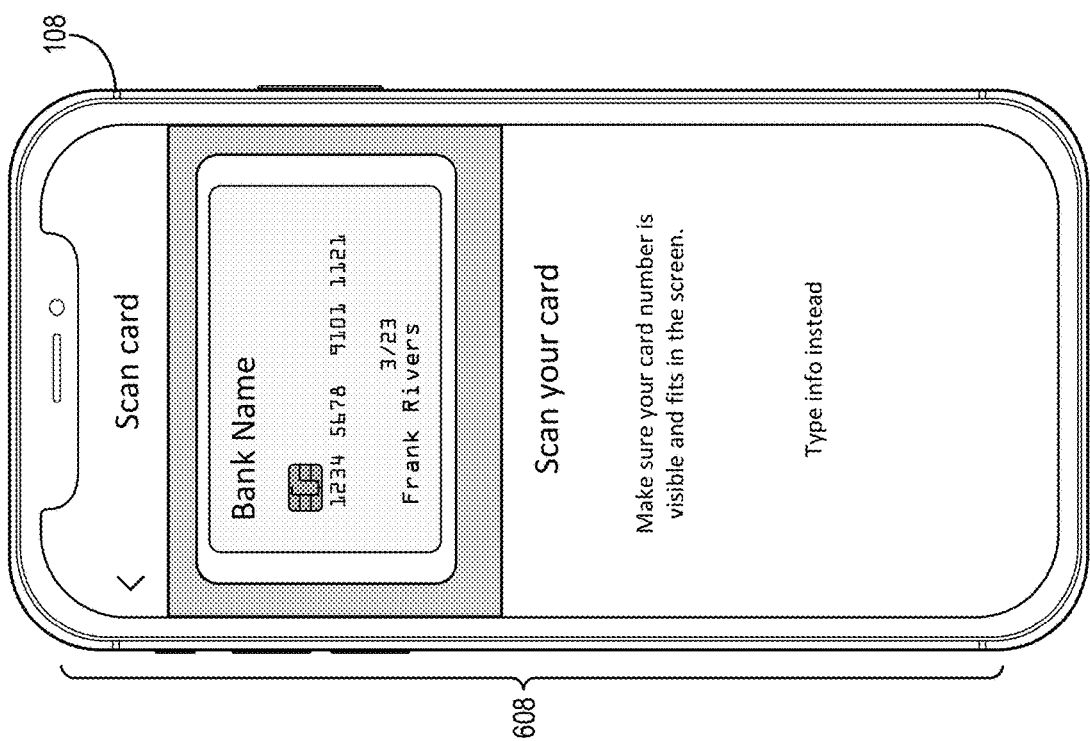

Based on a user placing a character-bearing card within view of a camera of the client device 108, the client device 108 (or the card-scan system 104) captures a set of card images depicting the character-bearing card. As illustrated in FIG. 6C, for example, the client device 108 displays a card-scan interface 608 as the client device 108 captures one or more images of the front of the character-bearing card for a user (e.g., "Frank Rivers"). In addition to capturing card images that depict the front of the character-bearing card, the card-scan system 104 further captures card images while a user manipulates the character-bearing card for three-dimensional movement (e.g., by flipping the card from font to back).

Based on capturing the set of card images, in some embodiments, the client device 108 (or the card-scan system 104) utilizes the card-scan machine learning model 206 to predict card characters from the set of card images. As illustrated in FIG. 6D, for example, the client device 108 displays a card-scan interface 610 that indicates predicted card characters overlaid on a view of the character-bearing card within the capture box. For instance, the client device 108 (or the card-scan system 104) predicts card characters, such as a card number, a first name, a last name, and an expiration date. As shown, the card-scan system 104 predicts most of the card characters correctly, but mistakes a "2" for a "3" and a "1" for a "7" in the card number, and further mistakes a "3" for an "8" in the expiration date.

Figure 6F:
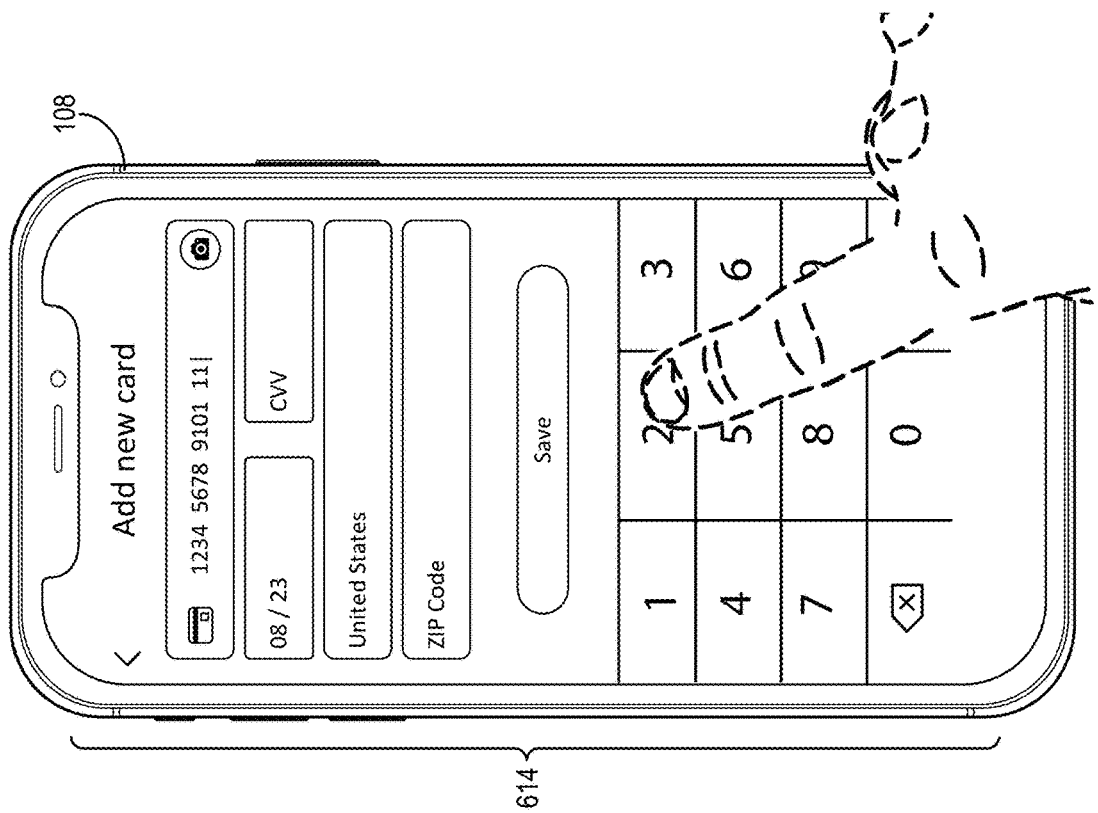
Figure 6E:
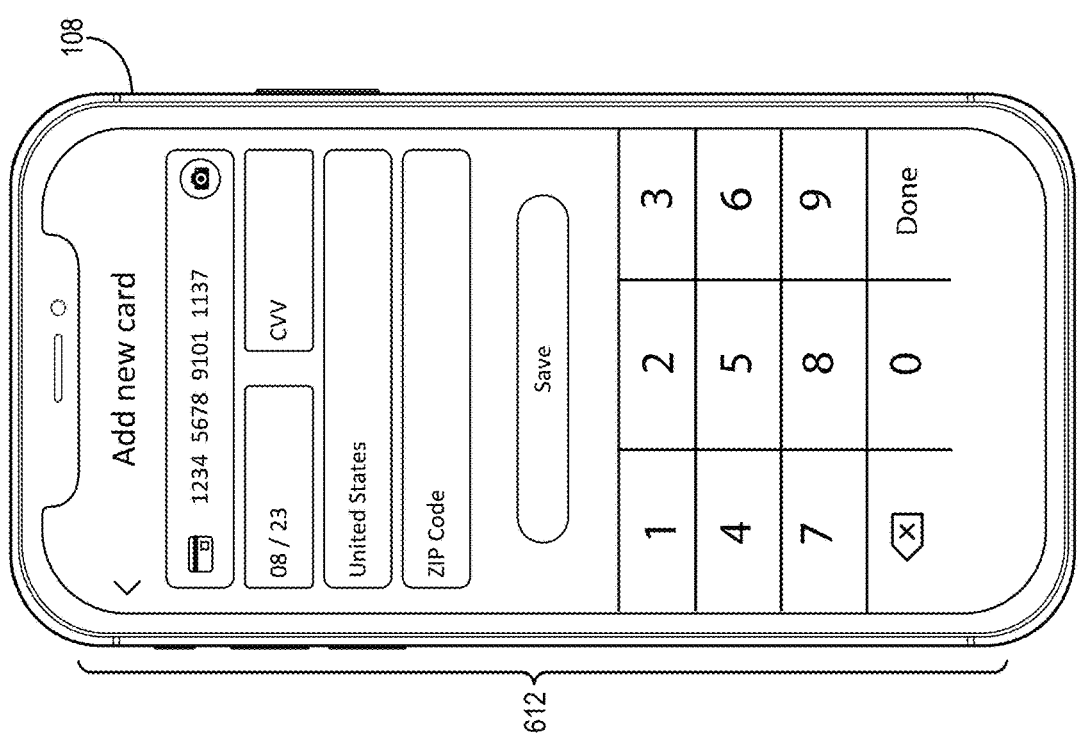

Upon predicting thee from the character-bearing card within the card-scan interface 610, the client device 108 re-presents (or the card-scan system 104 causes the client device 108 to re-present) a card-information interface to confirm or edit the predicted card characters. FIG. 6E illustrates the client device 108 displaying a card-information interface 612 including auto-filled card characters within respective fields. Indeed, the client device 108 (or the card-scan system 104) automatically fills the fields for payment information with the appropriate card characters. To maintain PCI compliance, however, the client device 108 (or the card-scan system 104) refrains from automatically filling certain fields, such as the CVV number field.

Based on user interaction with one or more fields of the card-information interface 612, the client device 108 (or the card-scan system 104) performs one or more edits to correct incorrectly predicted card characters. For example, FIG. 6F illustrates the client device 108 displaying a card-information interface 614 where a user is making edits to correct card characters that were predicted incorrectly. As mentioned above, based on detecting user interaction to correct one or more card characters, the client device 108 (or the card-scan system 104) generates, via the card-scan machine learning model 206, a card-scan gradient that indicates or represents the correction(s) in feature form.

Figure 7:
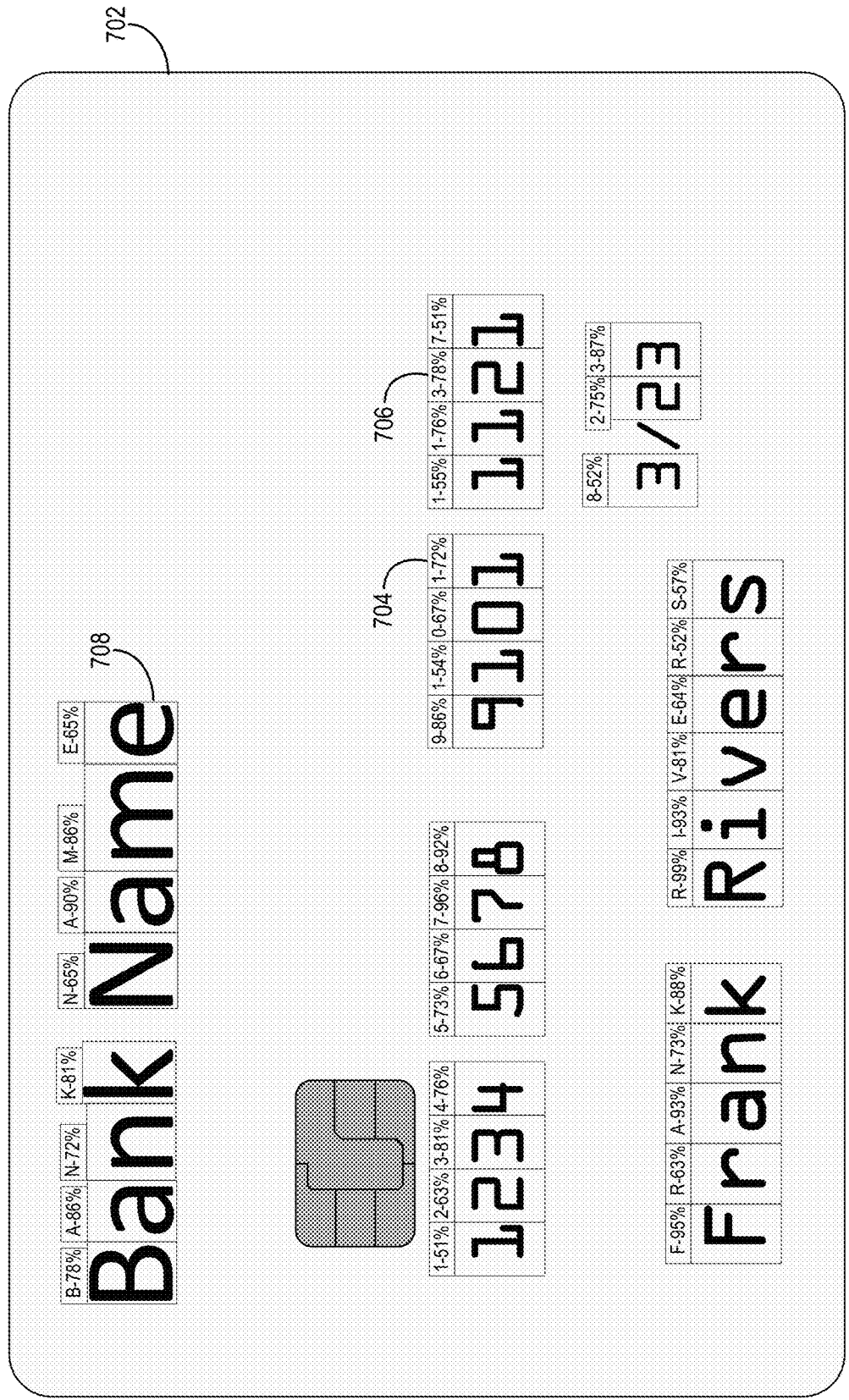
FIG. 7 illustrates an example character-bearing card with bounding boxes and classification scores in accordance with one or more embodiments.

As mentioned above, the card-scan system 104 (or the client device 108) can generate active-learning metrics utilizing a card-scan machine learning model 206. More specifically, the card-scan system 104 (or the client device 108) can utilize the card-scan machine learning model 206 to generate aggregated-classification-uncertainty metrics and aggregated-localization-tightness metrics which can be compared via a function to generate active-learning metrics. FIG. 7 illustrates a visual representation of classification-uncertainty metrics and localization-tightness metrics in accordance with one or more embodiments. In some embodiments, the client device 108 displays the character-bearing card 702 with the illustrated fields and metrics (e.g., within a card-scan interface), while in other embodiments, the character-bearing card 702 is for discussion purposes and is not necessarily displayed via the client device 108.

As illustrated in FIG. 7, the character-bearing card 702 includes bounding boxes around each of the identified card characters. For example, the character-bearing card 702 includes a bounding box 708 that encloses the letter "e" at the end of "Name." Additionally, the character-bearing card 702 includes respective bounding boxes for each of the other identified card characters as well. The tightness (e.g., closeness around the character) of the bounding box 708 indicates (or is caused by) a localization-tightness metric, as described above. Further, while FIG. 7 illustrates rectangular bounding boxes, the bounding boxes could be other shapes, regular or irregular in nature, and can more closely fit the contour of a letter, number, or other character.

In addition to the bounding boxes, the character-bearing card 702 also includes classification scores (e.g., classification probabilities) above each of the identified card characters. For example, the character-bearing card 702 includes a classification score 704 and a classification score 706. As shown, the classification score 704 indicates a percentage or a probability that the card-scan machine learning model 206 generates for the character class "1." Thus, the card-scan system 104 (or the client device 108) determines a classification score of 72% that the indicated card character is a "1" (e.g., belongs to the character class "1"). As shown, the card-scan system 104 (or the client device 108) correctly predicts the card character corresponding to the classification score 704.

Conversely, the card-scan system 104 (or the client device 108) determines the classification score 706 that indicates a score of 78% that the indicated card character is a "3." Thus, the card-scan system 104 (or the client device 108) incorrectly predicts the card character corresponding to the classification score 706 (which is actually a "2"). Looking to the other card characters within the character-bearing card 702, the card-scan system 104 (or the client device 108) generates classification scores for each one.

While FIG. 7 only illustrates highest-scoring-character classes for each card character, the card-scan system 104 (or the client device 108) determines classification scores for other character classes as well. Indeed, to determine classification-uncertainty metrics for each of the card characters, the card-scan system 104 (or the client device 108) compares a highest-scoring-character class and a next-highest-scoring-character class. In some cases, the top two character classes will have similar classification scores, and the card-scan system 104 (or the client device 108) determines a classification-uncertainty metric to account for possible error in predictions.

In some embodiments, the card-scan system 104 (or the client device 108) can provide or display a three-dimensional-card-scan interface. In particular, the card-scan system 104 can provide a three-dimensional-card-scan interface for display on the client device 108 to instruct a user to rotate a card for verifying its authenticity and physical nature.

Figure 8B:
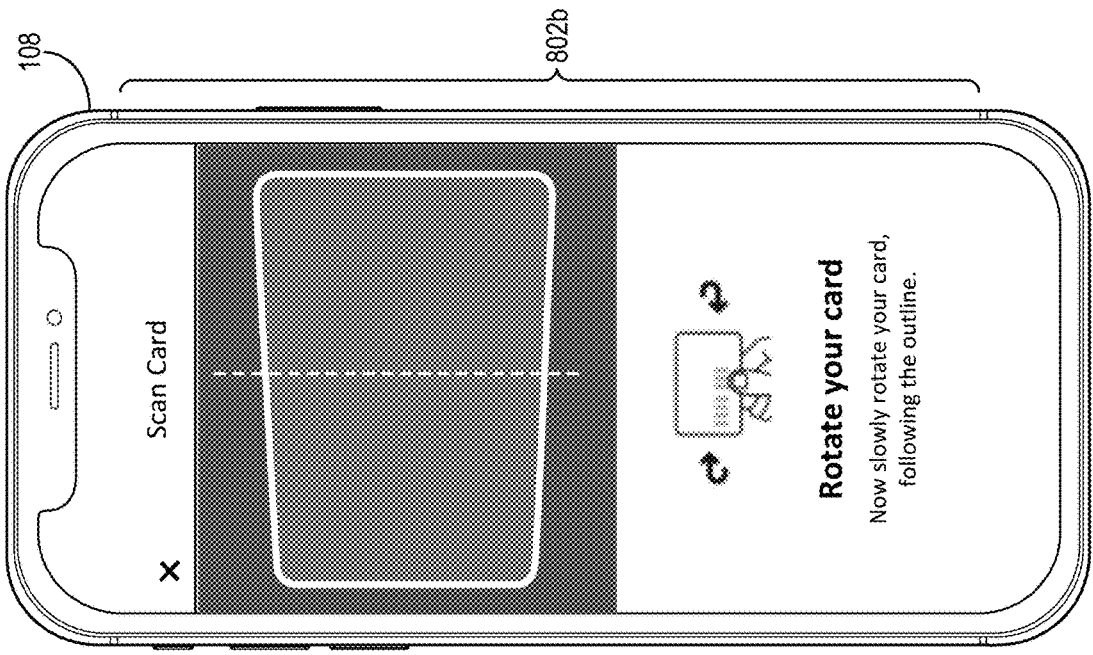
FIGS. 8A-8B illustrate example three-dimensional-card-scan interfaces to guide a user to rotate a card in accordance with one or more embodiments.
Figure 8A:
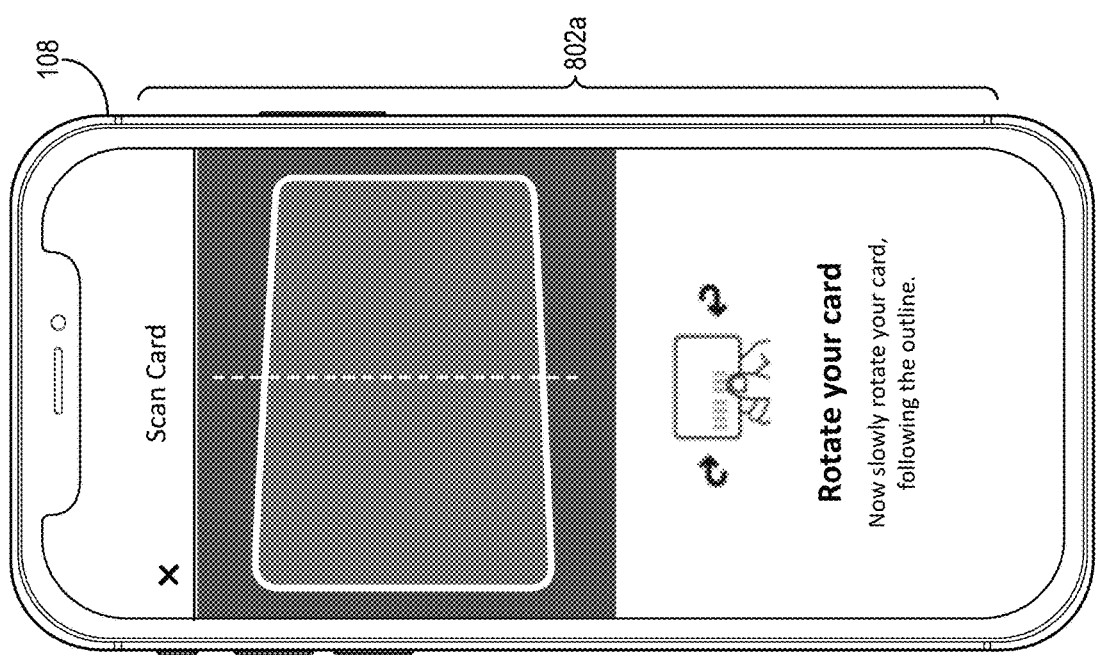

FIGS. 8A-8B illustrate different three-dimensional-card-scan interfaces in accordance with one or more embodiments.

As illustrated in FIG. 8A, the client device 108 displays a three-dimensional-card-scan interface 802a that includes a graphical card (e.g., the angled box with a white border). In addition, the three-dimensional-card-scan interface 802a includes instructions to guide a user to rotate a card (e.g., "Rotate your card") along with the graphical card. In some cases, the card-scan system 108 captures a real time (or near-real time) representation of a card via a camera and further instructs the user to rotate the card while in view of the camera to match the outlined area of the graphical card.

As indicated by the transition from FIG. 8A to FIG. 8B, for example, the graphical card is animated to illustrate rotations of the graphical card. Indeed, the card-scan system 104 animates the graphical card to show angle changes of the graphical card, thereby resembling rotations of a card. By animating the graphical card, the card-scan system 104 guides a user to rotate a card in a fashion that aligns with the movement of the animation (e.g., so that the card aligns with the graphical card, within a tolerance). In some embodiments, the card-scan system 104 (or the client device 108) animates movement of the graphical card only upon detecting a presence of a card within view of the camera and outlined (within a tolerance or threshold) by the graphical card.

As part of the animated guide, FIG. 8B illustrates a view of the graphical card that represents a frame of the animation after the frame shown in FIG. 8A. Indeed, as shown in FIG. 8B, the client device 108 displays a three-dimensional-card-scan interface 802b that includes the graphical card at a different angle. In some embodiments, the card-scan system 104 animates the graphical card to illustrate a rotation around the vertical axis (e.g., the dashed vertical line) to thereby instruct the user to rotate a card in like fashion.

Figure 9:
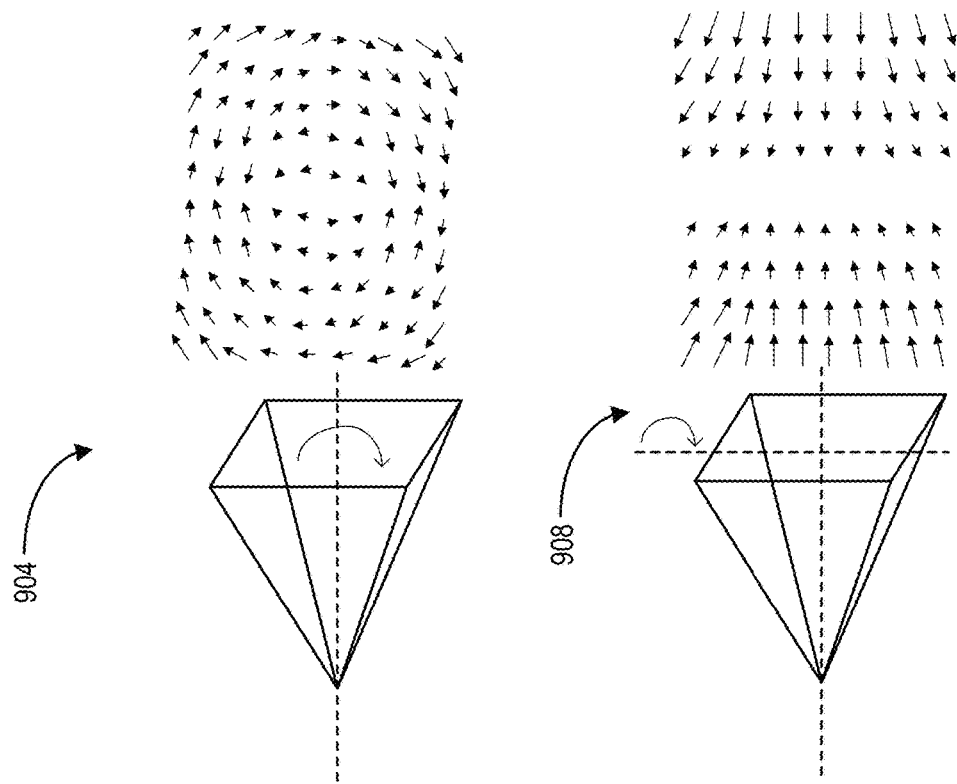
FIG. 9 illustrates example optical flow fields for three-dimensional, physical card verification in accordance with one or more embodiments.
Figure 9:
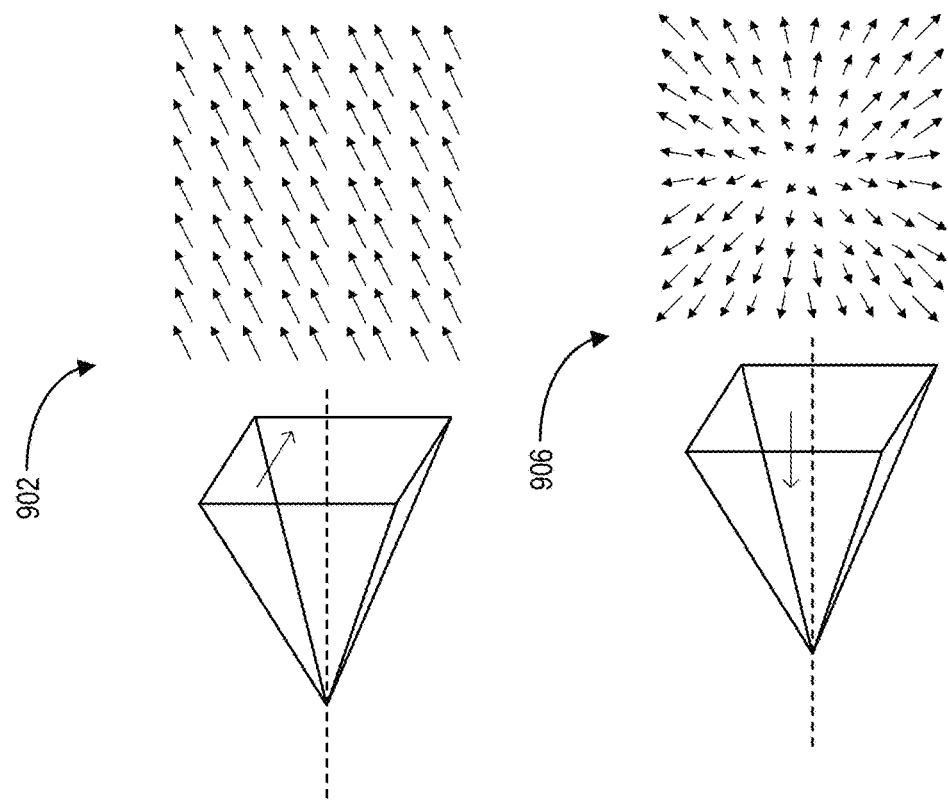

As mentioned, the card-scan system 104 (or the client device 108) can verify or validate the integrity of a three-dimensional, physical character-bearing card from a set of card images. In particular, the card-scan system 104 (or the client device 108) can perform, utilizing an optical-field detector 430 and a 3D validation algorithm 424 of the card-scan machine learning model 206, a three-dimensional analysis of the set of card images to verify that the character-bearing card depicted is a physical, three-dimensional character-bearing card. FIG. 9 illustrates optical flow fields for different movements that can be captured for a character-bearing card in accordance with one or more embodiments. For discussion purposes, the pyramids illustrated in FIG. 9 represent the perspective of a camera on the client device 108, where the point is the location of the camera and the rectangular base is the viewing window for capturing card images.

To detect the optical fields illustrated in FIG. 9, the card-scan system 104 can utilize one or more algorithms, such as a deep learning model or a feature extraction neural network. In some embodiments, the card-scan system 104 utilizes a deep learning model, such as FlowNet described by Alexey Dosovitskiy, Philipp Fischer, Eddy Ilg, Philip Hausser, Caner Hazirbas, Vladimir Golkov, Patrick Van Der Smagt, Daniel Cremers, and Thomas Brox in *Flownet: Learning Optical Flow with Convolutional Neural Networks*, Proceedings of the IEEE Int'l Conf. on Computer Vision, 2758-66 (2015), which is incorporated herein by reference in its entirety.

As illustrated in FIG. 9, the card-scan system 104 (or the client device 108) generates a translation optical flow field

902. In particular, the client device 108 captures a set of card images (e.g., the set of card images 402) that depicts the character-bearing card moving translationally from left to right. The card-scan system 104 (or the client device 108) thus generates, utilizing the 3D validation algorithm 424, an optical flow field that indicates the translational movement.

In addition, the card-scan system 104 (or the client device 108) generates a rotation optical flow field 904. Particularly, the client device 108 captures a set of card images (e.g., the set of card images 402) that depicts the character-bearing card moving rotationally about a vertical axis. The card-scan system 104 (or the client device 108) thus utilizes the 3D validation algorithm 424 to generate an optical flow field that indicates the rotational movement.

Further, as shown in FIG. 9, the card-scan system 104 (or the client device 108) generates a dilation optical flow field 906. In particular, the client device 108 captures a set of card images (e.g., the set of card images 402) that depicts the character-bearing card moving toward (or away from) the camera to dilate in appearance (e.g., to grow or shrink). The card-scan system 104 (or the client device 108) thus utilizes the 3D validation algorithm 424 to generate an optical flow field that indicates the dilation movement.

As further shown in FIG. 9, the card-scan system 104 (or the client device 108) generates a flip optical flow field 908. Indeed, the client device 108 captures a set of card images (e.g., the set of card images 402) that depicts the character-bearing card flipping from front to back (or back to front). The card-scan system 104 (or the client device 108) thus utilizes the 3D validation algorithm 424 to generate an optical flow field that indicates the flipping movement.

From one or more of the optical flow fields 902-908, the card-scan system 104 (or the client device 108) verifies that a character-bearing card depicted within the set of card images 402 is a physical, three-dimensional character-bearing card. Indeed, the card-scan system 104 (or the client device 108) determines whether the depicted character-bearing card is a three-dimensional object interacting with its surroundings or if it is a two-dimensional object interacting with its surroundings. Thus, the card-scan system 104 (or the client device 108) verifies that the character-bearing card is three-dimensional or two-dimensional (e.g., a picture of a character-bearing card). The card-scan system 104 (or the client device 108) can thus generate lower physical card-scores (e.g., the physical-card score 428) for two-dimensional character-bearing cards or can refuse to accept them for payment.

In some embodiments, the card-scan system 104 (or the client device 108) generates a three-dimensional score for the set of card images 402 to indicate a confidence level that the character-bearing card is a physical-three-dimensional character-bearing card based on the optical flow fields 902-908. For instance, the card-scan system 104 (or the client device 108) generates a weighted combination of scores associated with each of the optical flow fields 902-908 to generate a 3D validation score.

In one or more embodiments, the card-scan system 104 (or the client device 108) weights the optical flow fields 902-908 differently to verify that the character-bearing card is three-dimensional. For example, a flip movement is more indicative of three-dimensional aspects of a character-bearing card than other movements because different sides of the character-bearing card are shown (as opposed to just a single face of the card). Thus, the card-scan system 104 increases the weight for the flip optical flow field 908 more heavily as part of the 3D validation algorithm 424.

Figure 10:
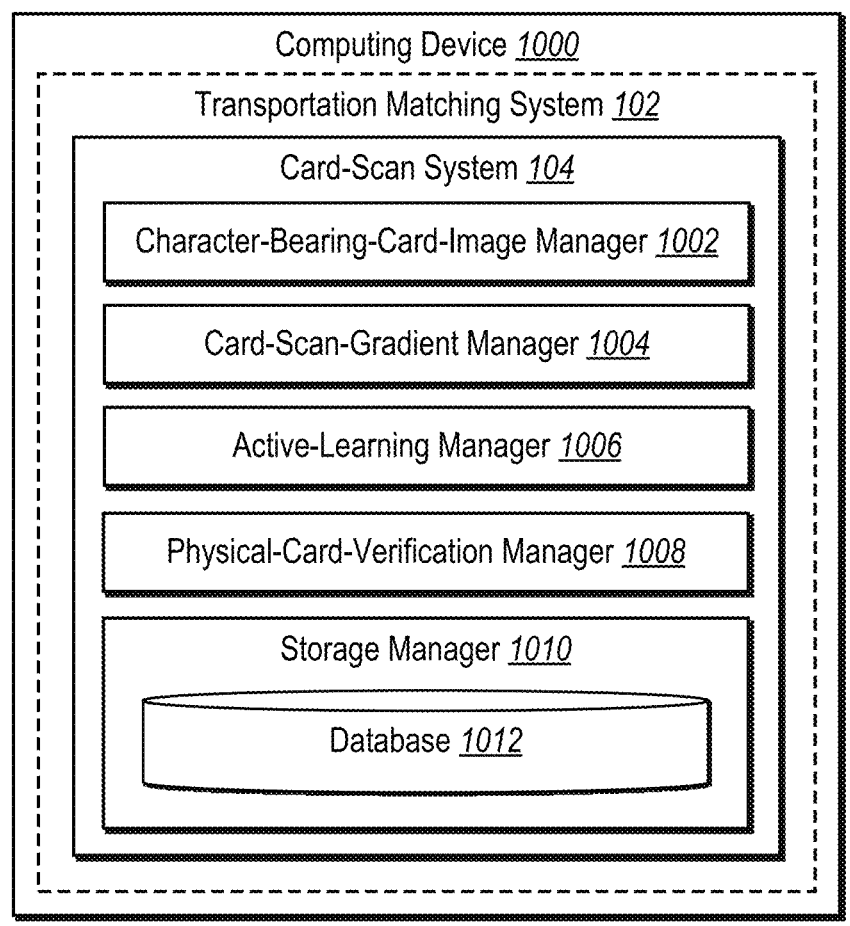
FIG. 10 illustrates a block diagram of an example computing device including various components of a card-scan system in accordance with one or more embodiments.

Looking now to FIG. 10, additional detail will be provided regarding components and capabilities of the card-scan system 104. Specifically, FIG. 10 illustrates an example schematic diagram of the card-scan system 104 on an example computing device 1000 (e.g., one or more of the client device 108 and/or the server(s) 106). As shown in FIG. 10, the card-scan system 104 may include a character-bearing-card-image manager 1002, a card-scan-vector manager 1004, an active-learning manager 1006, a physical-card-verification manager 1008, and a storage manager 1010.

As mentioned, the card-scan system 104 includes a character-bearing-card-image manager 1002. In particular, the character-bearing-card-image manager 1002 manages, maintains, captures, records, processes, analyzes, generates, or identifies a set of card images. For example, the character-bearing-card-image manager 1002 captures a set of card images in the form of a digital video or a moving image, where the set of character-bearing-card-images includes a depiction of a user moving a character-bearing card in three dimensions (e.g., flipping the character-bearing card).

As shown, the card-scan system 104 also includes a card-scan-vector manager 1004. In particular, the card-scan-vector manager 1004 manages, maintains, generates, extracts, receives, or identifies a card-scan gradient corresponding to a set of card images. For example, the card-scan-vector manager 1004 utilizes a card-scan machine learning model to predict card characters from a set of card images. In addition, the card-scan-vector manager 1004 receives user input to correct one or more predicted card characters. Additionally, the card-scan-vector manager 1004 generates a card-scan gradient to represent the one or more corrections made to the card characters.

Further, the card-scan system 104 includes an active-learning manager 1006. In particular, the active-learning manager 1006 manages, maintains, retrains, updates, or modifies a card-scan machine learning model. For example, the active-learning manager 1006 generates a set of modified card-scan gradients from a card-scan gradient indicating one or more corrections. In addition, the active-learning manager 1006 inputs the modified card-scan gradients into a card-scan machine learning model. Utilizing the card-scan machine learning model, the active-learning manager 1006 generates active-learning metrics for each of the modified card-scan gradients. Further, the active-learning manager 1006 ranks the modified card-scan gradients and labels the modified card-scan gradients based on the rankings, as described above. As also described above, the active-learning manager 1006 further retrains the card-scan machine learning model on positive and negative examples.

In addition, the card-scan system 104 includes a physical-card-verification manager 1008. In particular, the physical-card-verification manager 1008 manages, determines, verifies, validates, authenticates, or identifies a physical, three-dimensional character-bearing card. For example, the physical-card-verification manager 1008 utilizes a 3D validation algorithm to analyze three-dimensional movement of a character-bearing card as depicted or recorded in a set of card images. In addition, the physical-card-verification manager 1008 identifies one or more objects on a character-bearing card, such as a logo, a hologram, or a chip. Further, the physical-card-verification manager 1008 utilizes predicted card characters in combination with the detected objects and the three-dimensional movement to verify the integrity of a physical character-bearing card.

Further, the card-scan system 104 includes a storage manager 1010. In particular, the storage manager 1010 communicates with other components of the card-scan system 104 to store and provide various information within or from the database 1012 (e.g., the database 114) such as one or more algorithms for a card-scan machine learning model, obfuscated sets of card images, and obfuscated card characters (storing only those data permitted for PCI compliance.

In one or more embodiments, each of the components of the card-scan system 104 are in communication with one another using any suitable communication technologies. Additionally, the components of the card-scan system 104 can be in communication with one or more other devices including one or more client devices described above. It will be recognized that although the components of the card-scan system 104 are shown to be separate in FIG. 10, any of the subcomponents may be combined into fewer components, such as into a single component, or divided into more components as may serve a particular implementation. Furthermore, although the components of FIG. 10 are described in connection with the card-scan system 104, at least some of the components for performing operations in conjunction with the card-scan system 104 described herein may be implemented on other devices within the environment.

The components of the card-scan system 104 can include software, hardware, or both. For example, the components of the card-scan system 104 can include one or more instructions stored on a computer-readable storage medium and executable by processors of one or more computing devices (e.g., the computing device 1000). When executed by the one or more processors, the computer-executable instructions of the card-scan system 104 can cause the computing device 1000 to perform the methods described herein. Alternatively, the components of the card-scan system 104 can comprise hardware, such as a special purpose processing device to perform a certain function or group of functions. Additionally or alternatively, the components of the card-scan system 104 can include a combination of computer-executable instructions and hardware.

Furthermore, the components of the card-scan system 104 performing the functions described herein may, for example, be implemented as part of a stand-alone application, as a module of an application, as a plug-in for applications including content management applications, as a library function or functions that may be called by other applications, and/or as a cloud-computing model. Thus, the components of the card-scan system 104 may be implemented as part of a stand-alone application on a personal computing device or a mobile device. Alternatively or additionally, the components of the card-scan system 104 may be implemented in any application that allows creation and delivery of marketing content to users, including, but not limited to, various applications.

FIGS. 1-9, the corresponding text, and the examples provide a number of different systems, methods, and non-transitory computer readable media for updating a card-scan machine learning model using an active-learning technique based on a card-scan machine learning model that indicates one or more corrections to predicted card characters. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
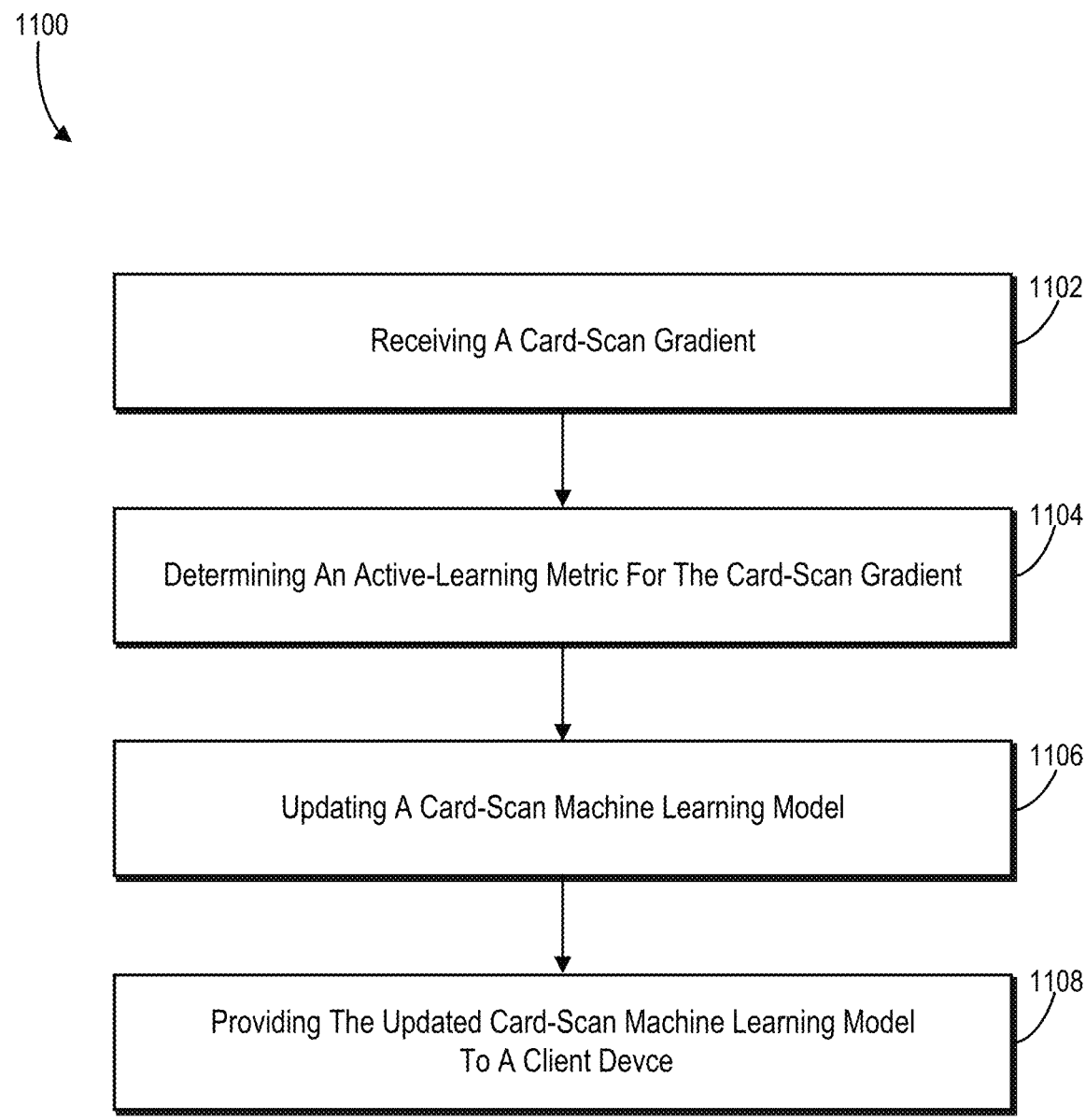
FIG. 11 illustrates an example flow of acts for updating a card-scan machine learning model using an active-learning technique in accordance with one or more embodiments.

While FIG. 11 illustrates acts according to some embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for updating a card-scan machine learning model using an active-learning technique based on a card-scan machine learning model that indicates one or more corrections to predicted card characters. The series of acts 1100 can include an act 1102 of receiving a card-scan gradient. In particular, the act 1102 can involve receiving, from a client device, a card-scan gradient comprising multidimensional values representing one or more corrections to predicted card characters made by a card-scan machine learning model for a character-bearing card.

The series of acts 1100 can also include an act of generating, from the card-scan gradient, a plurality of modified card-scan gradients comprising a first modified card-scan gradient and a second modified card-scan gradient by modifying one or more features of the card-scan gradient according to a probability distribution.

In addition, the series of acts 1100 includes an act 1104 of determining an active-learning metric for the card-scan gradient. In particular, the act 1104 can involve determining, based on the card-scan gradient, an active-learning metric indicating a predicted measure of the card-scan machine learning model generating more accurate card-character predictions based on variations of the card-scan gradient. In some cases, the act 1104 involves determining an active-learning metric that indicates a predicted measure of accuracy improvement for the card-scan machine learning model based on variations of the card-scan gradient.

The act 1104 can involve determining an aggregated-classification-uncertainty metric reflecting a measure of confidence that a predicted card character for the card-scan gradient is correct. Indeed, the act 1104 can include determining a classification-uncertainty metric as part of the aggregated-classification-uncertainty metric for the card-scan gradient by comparing a first probability of a predicted card character corresponding to a first character and a second probability of the predicted card character corresponding to a second character. The act 1104 can further involve determining an aggregated-localization-tightness metric for the card-scan gradient representing a tightness of bounding boxes enclosing the card character and generating the active-learning metric based on a function of the aggregated-classification-uncertainty metric and the aggregated-localization-tightness metric.

Additionally, the series of acts 1100 can include an act of ranking the plurality of modified card-scan gradients relative to each other based on their respective active-learning metrics. Indeed, ranking the plurality of modified card-scan gradients can include ranking a given card-scan gradient relative to other card-scan gradients based on their respective active-learning metrics. The series of acts 1100 can also include an act of, based on the ranking, identifying the first modified card-scan gradient as comprising low-information entropy and the second modified card-scan gradient as comprising high-information-entropy. In addition, the series of acts 1100 can include an act of labeling characters corresponding to the first modified card-scan gradient and the second modified card-scan gradient to indicate correct card characters. Labeling the characters can include providing the first modified card-scan gradient to an automatic labeling system and providing the second modified card-scan gradient to a labeling service or for visualization within a labeling interface.

Further, the series of acts 1100 includes an act 1106 of generating an updated card-scan machine learning model. In particular, the act 1106 can involve generating an updated card-scan machine learning model by modifying a stored version of the card-scan machine learning model based on the active-learning metric. The act 1106 can include retraining the stored version of the card-scan machine learning model to generate predictions of card characters based on the first modified card-scan gradient and the second modified card-scan gradient. In some embodiments, the act 1106 can involve determining, based on a previous active-learning metric, a learning-modification weight that balances an effect of the classification-uncertainty metric or the localization-tightness metric on the active-learning metric to modify learning of the card-scan machine learning model. The act 1106 can further involve generating the active-learning metric based on a function comprising the aggregated-classification-uncertainty metric, the learning-modification weight, and the aggregated-localization-tightness metric.

As further shown in FIG. 11, the series of acts 1100 includes an act 1108 of providing the updated card-scan machine learning model to a client device. In particular, the act 1108 can involve providing the updated card-scan machine learning model to the client device.

In some embodiments, the series of acts 1100 can include an act of capturing, via a client device, a set of card images of a character-bearing card. The series of acts 1100 can also include an act of generating, utilizing a card-scan machine learning model, predicted card characters from the set of card images. In addition, the series of acts 1100 can include an act of generating a card-scan gradient comprising multidimensional values representing one or more corrections to the predicted card characters. Further, the series of acts 1100 can include an act of determining, based on the card-scan gradient, an active-learning metric indicating a predicted measure of the card-scan machine learning model generating more accurate card-character character predictions utilizing variations of the card-scan gradient. The series of acts 1100 can also include an act of generating an updated card-scan machine learning model by modifying the card-scan machine learning model based on the active-learning metric.

In one or more embodiments, the series of acts 1100 includes an act of generating the card-scan machine learning model by modifying a traffic-sign machine learning model for identifying traffic-sign characters. Generating the card-scan machine learning model can involve generating a subtraction space that indicates discrepancies between features generated for traffic-sign characters utilizing the traffic-sign machine learning model and features generated for card characters utilizing the traffic-sign machine learning model. Generating the card-scan machine learning model can further involve modifying a loss function associated with the traffic-sign machine learning model to reduce the subtraction space.

The series of acts 1100 can include an act of identifying, via the client device, one or more of a logo, a hologram or a chip on the character-bearing card by utilizing the card-scan machine learning model to process the set of card images. Additionally, the series of acts can include verifying three-dimensional movement of the character-bearing card from the set of card images utilizing an optical-field detector of the card-scan machine learning model and, based on the three-dimensional movement and identification of one or more of the logo, the hologram, or the chip, verify that the character-bearing card associated with the set of card images is a physical character-bearing card.

In one or more embodiments, the series of acts 1100 includes an act of providing, for display on the client device, a three-dimensional-card-scan interface comprising an animated guide depicting angle changes to a graphical card to instruct a user to rotate the character-bearing card in accordance with the animated guide.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
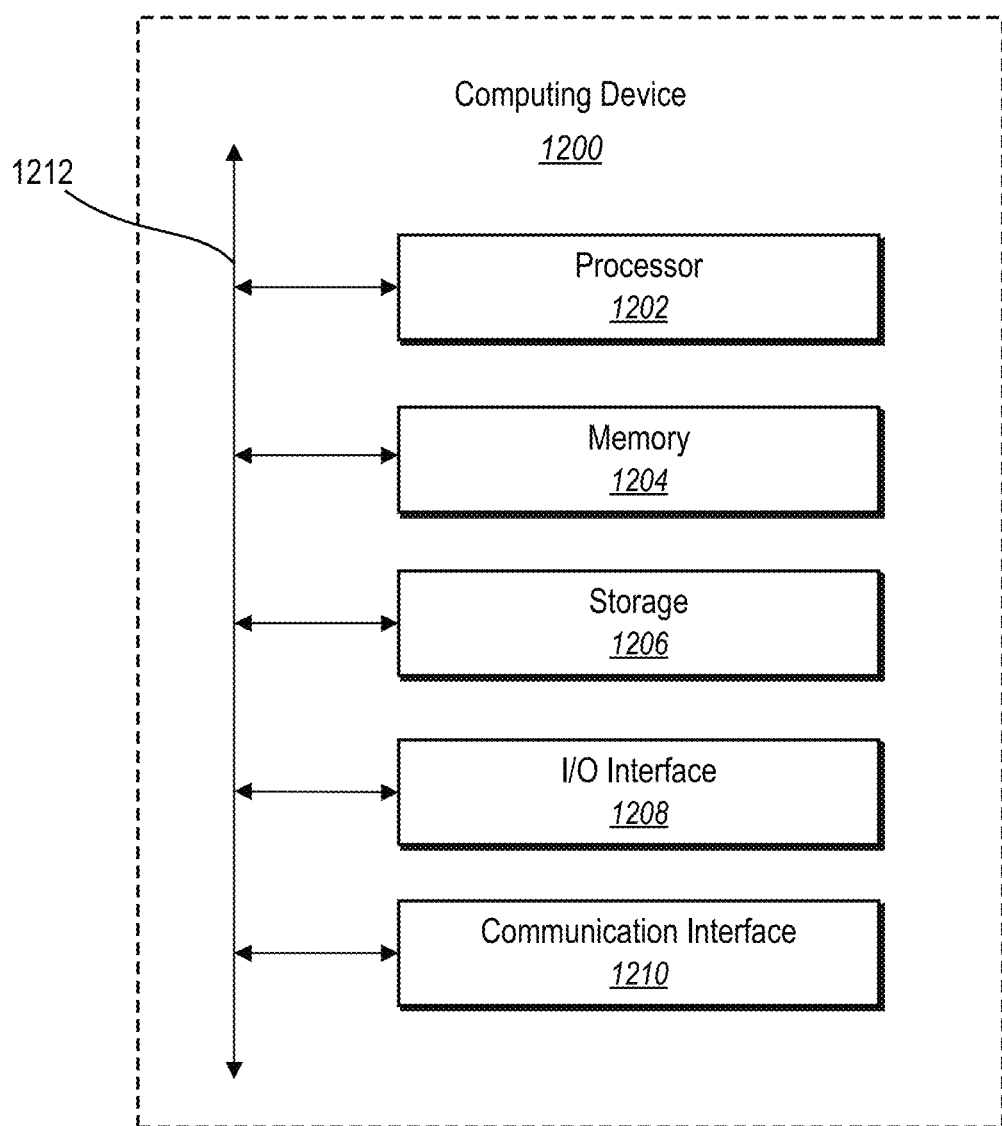
FIG. 12 illustrates a block diagram of a computing device for implementing one or more embodiments of the present disclosure.

FIG. 12 illustrates, in block diagram form, an exemplary computing device 1200 (e.g., the client device 108 or the server(s) 106) that may be configured to perform one or more of the processes described above. One will appreciate that the card-scan system 104 can comprise implementations of the computing device 1200, including, but not limited to, the client device 108 and/or the server(s) 106. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive ("HDD"), flash memory, a Universal Serial Bus ("USB") drive or a combination of these or other storage devices.

The computing device 1200 also includes one or more input or output interface 1208 (or "I/O interface 1208"), which are provided to allow a user (e.g., requester or provider) to provide input to (such as user strokes), receive output from, and otherwise transfer data to and from the computing device 1200. These I/O interface 1208 may include a mouse, keypad or a keyboard, a touch screen, camera, optical scanner, network interface, modem, other known I/O devices or a combination of such I/O interface 1208. The touch screen may be activated with a stylus or a finger.

The I/O interface 1208 may include one or more devices for presenting output to a user, including, but not limited to, a graphics engine, a display (e.g., a display screen), one or more output providers (e.g., display providers), one or more audio speakers, and one or more audio providers. In certain embodiments, interface 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include a bus 1212. The bus 1212 can comprise hardware, software, or both that connects components of computing device 1200 to each other.

Figure 13:
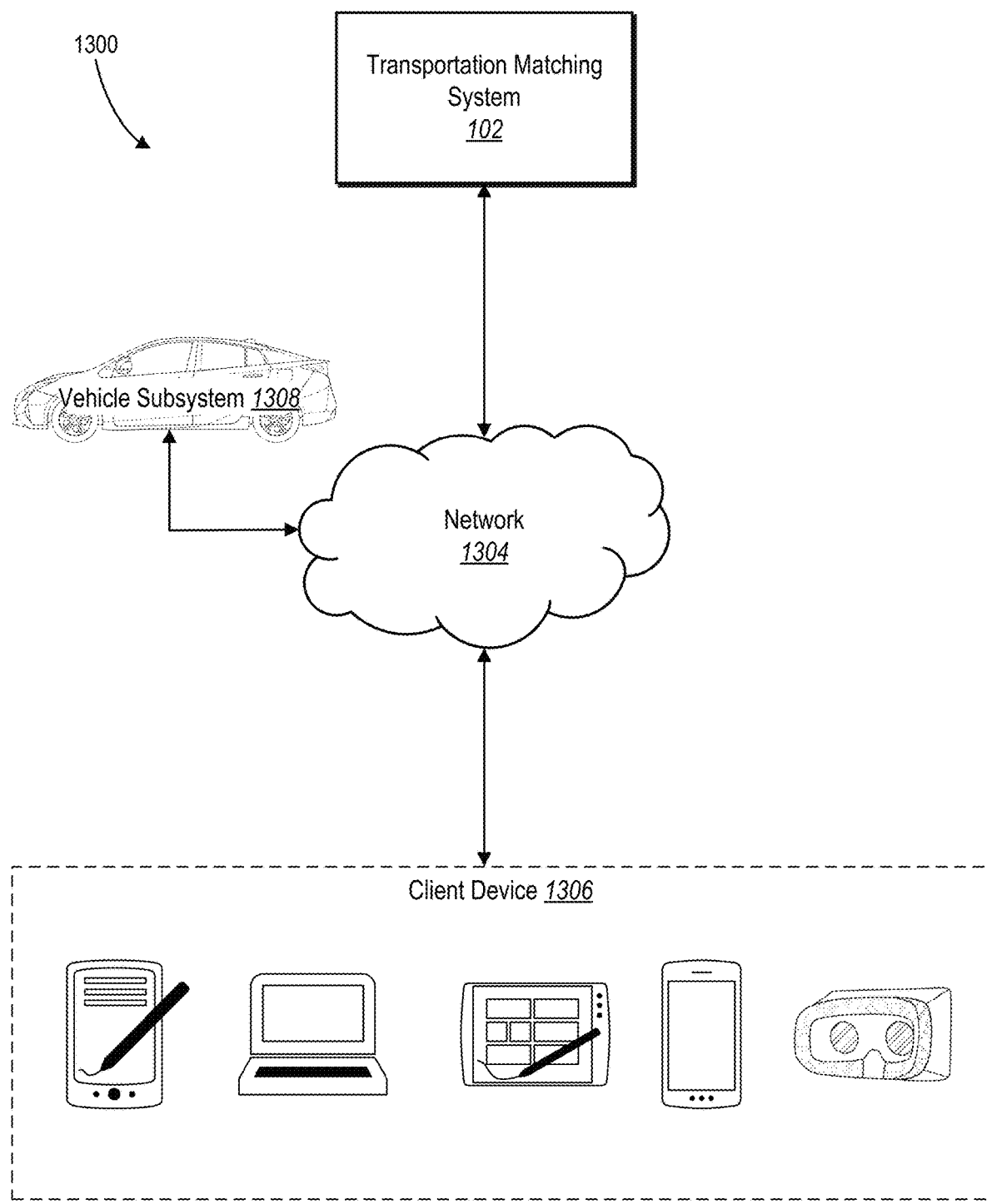
FIG. 13 illustrates an example environment for a transportation matching system in accordance with one or more embodiments.

FIG. 13 illustrates an example network environment 1300 of the transportation matching system 102. The network environment 1300 includes a client device 1306 (e.g., the client device 108 or the requester device 116), a transportation matching system 102, and a vehicle subsystem 1308 connected to each other by a network 1304. Although FIG. 13 illustrates a particular arrangement of the client device 1306, the transportation matching system 102, the vehicle subsystem 1308, and the network 1304, this disclosure contemplates any suitable arrangement of client device 1306, the transportation matching system 102, the vehicle subsystem 1308, and the network 1304. As an example, and not by way of limitation, two or more of client device 1306, the transportation matching system 102, and the vehicle subsystem 1308 communicate directly, bypassing network 1304. As another example, two or more of client device 1306, the transportation matching system 102, and the vehicle subsystem 1308 may be physically or logically co-located with each other in whole or in part.

Moreover, although FIG. 13 illustrates a particular number of client devices 1306, transportation matching systems 102, vehicle subsystems 1308, and networks 1304, this disclosure contemplates any suitable number of client devices 1306, transportation matching system 102, vehicle subsystems 1308, and networks 1304. As an example, and not by way of limitation, network environment 1300 may include multiple client device 1306, transportation matching system 102, vehicle subsystems 1308, and/or networks 1304.

This disclosure contemplates any suitable network 1304. As an example, and not by way of limitation, one or more portions of network 1304 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1304 may include one or more networks 1304.

Links may connect client device 1306, card-scan system 104, and vehicle subsystem 1308 to network 1304 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1300. One or more first links may differ in one or more respects from one or more second links.

In particular embodiments, the client device 1306 may be an electronic device including hardware, software, or embedded logic components or a combination of two or more such components and capable of carrying out the appropriate functionalities implemented or supported by client device 1306. As an example, and not by way of limitation, a client device 1306 may include any of the computing devices discussed above in relation to FIG. 12. A client device 1306 may enable a network user at the client device 1306 to access network 1304. A client device 1306 may enable its user to communicate with other users at other client devices 1306.

In particular embodiments, the client device 1306 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1306 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1306 one or more Hyper Text Markup Language ("HTML") files responsive to the HTTP request. The client device 1306 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 102 may be a network-addressable computing system that can host a transportation matching network. The transportation matching system 102 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 102. In addition, the transportation matching system 102 may manage identities of service requesters such as users/requesters. In particular, the transportation matching system 102 may maintain requester data such as driving/riding histories, personal data, or other user data in addition to navigation and/or traffic management services or other location services (e.g., GPS services).

In particular embodiments, the transportation matching system 102 may manage transportation matching services to connect a user/requester with a vehicle and/or provider. By managing the transportation matching services, the transportation matching system 102 can manage the distribution and allocation of resources from vehicle systems and user resources such as GPS location and availability indicators, as described herein.

The transportation matching system 102 may be accessed by the other components of network environment 1300 either directly or via network 1304. In particular embodiments, the transportation matching system 102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1306, or a transportation matching system 102 to manage, retrieve, modify, add, or delete, the information stored in data store.

In particular embodiments, the transportation matching system 102 may provide users with the ability to take actions on various types of items or objects, supported by the transportation matching system 102. As an example, and not by way of limitation, the items and objects may include transportation matching networks to which users of the transportation matching system 102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 102 or by an external system of a third-party system, which is separate from transportation matching system 102 and coupled to the transportation matching system 102 via a network 1304.

In particular embodiments, the transportation matching system 102 may be capable of linking a variety of entities. As an example, and not by way of limitation, the transportation matching system 102 may enable users to interact with each other or other entities, or to allow users to interact with these entities through an application programming interfaces ("API") or other communication channels.

In particular embodiments, the transportation matching system 102 may include a variety of servers, sub-systems, programs, modules, logs, and data stores. In particular embodiments, the transportation matching system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requester profile) store, connection store, third-party content store, or location store. The transportation matching system 102 may also include suitable components such as network interfaces, security mechanisms, load balancers, failover servers, management-and-network-operations consoles, other suitable components, or any suitable combination thereof. In particular embodiments, the transportation matching system 102 may include one or more user-profile stores for storing user profiles for transportation providers and/or transportation requesters. A user profile may include, for example, biographic information, demographic information, behavioral information, social information, or other types of descriptive information, such as interests, affinities, or location.

The web server may include a mail server or other messaging functionality for receiving and routing messages between the transportation matching system 102 and one or more client devices 1306. An action logger may be used to receive communications from a web server about a user's actions on or off the transportation matching system 102. In conjunction with the action log, a third-party-content-object log may be maintained of user exposures to third-party-content objects. A notification controller may provide information regarding content objects to a client device 1306. Information may be pushed to a client device 1306 as notifications, or information may be pulled from client device 1306 responsive to a request received from client device 1306. Authorization servers may be used to enforce one or more privacy settings of the users of the transportation matching system 102. A privacy setting of a user determines how particular information associated with a user can be shared. The authorization server may allow users to opt in to or opt out of having their actions logged by the transportation matching system 102 or shared with other systems, such as, for example, by setting appropriate privacy settings. Third-party-content-object stores may be used to store content objects received from third parties. Location stores may be used for storing location information received from client devices 1306 associated with users.

In addition, the vehicle subsystem 1308 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1308 can include an autonomous vehicle—e.g., a vehicle that does not require a human operator. In these embodiments, the vehicle subsystem 1308 can perform maneuvers, communicate, and otherwise function without the aid of a human provider, in accordance with available technology.

In particular embodiments, the vehicle subsystem 1308 may include one or more sensors incorporated therein or associated thereto. For example, sensor(s) can be mounted on the top of the vehicle subsystem 1308 or else can be located within the interior of the vehicle subsystem 1308. In certain embodiments, the sensor(s) can be located in multiple areas at once—e.g., split up throughout the vehicle subsystem 1308 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1308 may include a communication device capable of communicating with the client device 1306 and/or the card-scan system 104. For example, the vehicle subsystem 1308 can include an on-board computing device communicatively linked to the network 1304 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   a non-transitory computer readable medium comprising instructions that, when executed by the at least one processor, cause the system to:
   capture, via a client device, a set of card images of a character-bearing card;
   generate predicted card characters from the set of card images based at least on parameters of a card-scan machine learning model;
   generate a card-scan gradient comprising multidimensional values representing one or more corrections to the predicted card characters;
   determine an aggregated-classification-uncertainty metric reflecting a measure of confidence that the predicted card characters for the card-scan gradient are correct;
   determine an aggregated-localization-tightness metric for the card-scan gradient representing a tightness of bounding boxes enclosing the predicted card characters;
   determine an active-learning metric that indicates a predicted measure of accuracy improvement for the card-scan machine learning model based on the aggregated-classification-uncertainty metric and the aggregated-localization-tightness metric; and
   update the card-scan machine learning model by modifying the card-scan machine learning model based on the active-learning metric.

2. The system of claim 1, further comprising instructions that, when executed by the at least one processor, cause the system to determine the aggregated-classification-uncertainty metric by combining two or more classification-uncertainty metrics associated with the predicted card characters.

3. The system of claim 1, further comprising instructions that, when executed by the at least one processor, cause the system to determine a classification-uncertainty metric as part of the aggregated-classification-uncertainty metric by comparing a first probability of a predicted card character corresponding to a first character and a second probability of the predicted card character corresponding to a second character.

4. The system of claim 1, further comprising instructions that, when executed by the at least one processor, cause the system to generate the active-learning metric by:
   determining a learning-modification weight to balance an effect of the aggregated-classification-uncertainty metric or the aggregated-localization-tightness metric on the active-learning metric; and
   generating the active-learning metric based on a function comprising the aggregated-classification-uncertainty metric, the learning-modification weight, and the aggregated-localization-tightness metric.

5. The system of claim 1, further comprising instructions that, when executed by the at least one processor, cause the system to:
   rank the card-scan gradient relative to other card-scan gradients based on their respective active-learning metrics;
   based on a ranking of card-scan gradients, identify the card-scan gradient as comprising low-information entropy or high-information entropy; and
   label characters corresponding to the card-scan gradient to indicate correct card characters by:
      providing a low-information-entropy card-scan gradient to an automatic labeling system for labeling; or
      providing a high-information-entropy card-scan gradient for visualization within a labeling interface for labeling.

6. The system of claim 1, further comprising instructions that, when executed by the at least one processor, cause the system to update the card-scan machine learning model by modifying the parameters of the card-scan machine learning model through retraining a stored version of the card-scan machine learning model to generate predictions of card characters based on the card-scan gradient and one or more correctly labeled card-scan gradients.

7. The system of claim 1, further comprising instructions that, when executed by the at least one processor, cause the system to:
   detect three-dimensional movement of the character-bearing card from the set of card images utilizing an optical-field detector of the card-scan machine learning model; and
   based on the three-dimensional movement, verify that the character-bearing card associated with the set of card images is a physical character-bearing card.

8. A method comprising:
   receiving, from a client device, a card-scan gradient comprising multidimensional values representing one or more corrections to predicted card characters made by a card-scan machine learning model for a character-bearing card;
   determining an aggregated-classification-uncertainty metric reflecting a measure of confidence that the predicted card characters for the card-scan gradient are correct;
   determining an aggregated-localization-tightness metric for the card-scan gradient representing a tightness of bounding boxes enclosing the predicted card characters;
   determining an active-learning metric that indicates a predicted measure of accuracy improvement for the card-scan machine learning model based on the aggregated-classification-uncertainty metric and the aggregated-localization-tightness metric;
   updating the card-scan machine learning model by modifying a stored version of the card-scan machine learning model based on the active-learning metric; and
   providing the updated card-scan machine learning model to the client device.

9. The method of claim 8, further comprising generating, from the card-scan gradient, a plurality of modified card-scan gradients comprising a first modified card-scan gradient and a second modified card-scan gradient by modifying one or more features of the card-scan gradient according to a probability distribution.

10. The method of claim 8, wherein determining the aggregated-classification-uncertainty metric comprises combining two or more classification-uncertainty metrics associated with the predicted card characters.

11. The method of claim 9, further comprising:
ranking the plurality of modified card-scan gradients relative to each other based on their respective active-learning metrics; and
based on the ranking, identifying the first modified card-scan gradient as comprising low-information entropy and the second modified card-scan gradient as comprising high-information-entropy.

12. The method of claim 11, further comprising labeling characters corresponding to the first modified card-scan gradient and the second modified card-scan gradient to indicate correct card characters by:
providing the first modified card-scan gradient to an automatic labeling system for labeling; and
providing the second modified card-scan gradient for visualization within a labeling interface for labeling.

13. The method of claim 9, wherein updating the card-scan machine learning model comprises retraining the stored version of the card-scan machine learning model to generate predictions of card characters based on the first modified card-scan gradient and the second modified card-scan gradient.

14. The method of claim 8, further comprising providing, for display on the client device, a three-dimensional-card-scan interface comprising an animated guide depicting angle changes to a graphical card to instruct a user to rotate the character-bearing card in accordance with the animated guide.

15. A non-transitory computer readable medium comprising instructions that, when executed by at least one processor, cause a computing device to:
receive, from a client device, a card-scan gradient comprising multidimensional values representing one or more corrections to predicted card characters made by a card-scan machine learning model for a character-bearing card;
determine an aggregated-classification-uncertainty metric reflecting a measure of confidence that the predicted card characters for the card-scan gradient are correct;
determine an aggregated-localization-tightness metric for the card-scan gradient representing a tightness of bounding boxes enclosing the predicted card characters;
determine an active-learning metric that indicates a predicted measure of accuracy improvement for the card-scan machine learning model based on the aggregated-classification-uncertainty metric and the aggregated-localization-tightness metric;
update the card-scan machine learning model by modifying a stored version of the card-scan machine learning model based on the active-learning metric; and
provide the updated card-scan machine learning model to the client device.

16. The non-transitory computer readable medium of claim 15, further comprising instructions that, when executed by the at least one processor, cause the computing device to determine the aggregated-classification-uncertainty metric by combining two or more classification-uncertainty metrics associated with the predicted card characters.

17. The non-transitory computer readable medium of claim 15, wherein generating the active-learning metric comprises:
determining, based on a previous active-learning metric, a learning-modification weight to balance an effect of the aggregated-classification-uncertainty metric or the aggregated-localization-tightness metric on the active-learning metric; and
generate the active-learning metric based on a function comprising the aggregated-classification-uncertainty metric, the learning-modification weight, and the aggregated-localization-tightness metric.

18. The non-transitory computer readable medium of claim 15, further comprising instructions that, when executed by the at least one processor, cause the computing device to:
rank a plurality of card-scan gradients relative to each other based on respective active-learning metrics;
based on the ranking, identify a low-information-entropy card-scan gradient and a high-information-entropy card-scan gradient; and
label characters corresponding to the low-information-entropy card-scan gradient and the high-information-entropy card-scan gradient indicate correct card characters by:
providing the low-information-entropy card-scan gradient to an automatic labeling system for labeling; and
providing the high-information-entropy card-scan gradient for visualization within a labeling interface for labeling.

19. The non-transitory computer readable medium of claim 18, further comprising instructions that, when executed by the at least one processor, cause the computing device to update the card-scan machine learning model by modifying parameters of the card-scan machine learning model through retraining a stored version of the card-scan machine learning model to generate predictions of card characters based on the low-information-entropy card-scan gradient and the high-information-entropy card-scan gradient.

20. The non-transitory computer readable medium of claim 15, further comprising instructions that, when executed by the at least one processor, cause the computing device to:
identify, via the client device, one or more of a logo, a hologram, or a chip on the character-bearing card by utilizing an object-detection algorithm of the card-scan machine learning model to process a set of card images;
determine a card number from the character-bearing card by utilizing a parser from the card-scan machine learning model to scan fields detected within the set of card images;
detect, via the client device, three-dimensional movement of the character-bearing card from the set of card images utilizing an optical-field detector of the card-scan machine learning model; and
based on the three-dimensional movement, the card number, and identification of one or more of the logo, the hologram, or the chip, cause the client device to utilize the card-scan machine learning model to verify that the character-bearing card associated with the set of card images is valid and a physical character-bearing card.

* * * * *